(12) United States Patent
Imura

(10) Patent No.: US 8,466,642 B2
(45) Date of Patent: Jun. 18, 2013

(54) CONTROL APPARATUS FOR ELECTRIC ROTATING MACHINE

(75) Inventor: Akihiro Imura, Chita-gun (JP)

(73) Assignee: Denso Corporation, Kariya (JP)

( * ) Notice: Subject to any disclaimer, the term of this patent is extended or adjusted under 35 U.S.C. 154(b) by 317 days.

(21) Appl. No.: 13/044,245

(22) Filed: Mar. 9, 2011

(65) Prior Publication Data
US 2011/0227515 A1   Sep. 22, 2011

(30) Foreign Application Priority Data

Mar. 18, 2010   (JP) ................................. 2010-063038

(51) Int. Cl.
    *H02P 6/14* (2006.01)
(52) U.S. Cl.
    CPC ...................................... *H02P 6/14* (2013.01)
    USPC ................. 318/400.01; 318/438; 318/567
(58) Field of Classification Search
    CPC ........................................................ H02P 6/14
    USPC ....................................... 318/400.01, 438, 567
    See application file for complete search history.

(56) References Cited

U.S. PATENT DOCUMENTS

| 6,058,031 A * | 5/2000 | Lyons et al. ................... 363/67 |
| 2006/0125435 A1 | 6/2006 | Geyer et al. |
| 2008/0061727 A1 | 3/2008 | Tomigashi |
| 2009/0160376 A1 | 6/2009 | Yamada |

FOREIGN PATENT DOCUMENTS

| JP | A-9-168291 | 6/1997 |
| JP | A-2006-174697 | 6/2006 |
| JP | A-2008-67556 | 3/2008 |
| JP | B2-4149709 | 9/2008 |
| JP | A-2009-153254 | 7/2009 |

OTHER PUBLICATIONS

Jan. 10, 2012 Office Action issued in Japanese Patent Application No. 2010-063038 (with translation).

* cited by examiner

*Primary Examiner* — Walter Benson
*Assistant Examiner* — David Luo
(74) *Attorney, Agent, or Firm* — Oliff & Berridge, PLC

(57) ABSTRACT

The control apparatus for an electric rotating machine includes a prediction section to predict a controlled variable of the electric rotating machine applied with an output voltage of a power conversion circuit for each of prescribed operation states of the power conversion circuit, and a manipulation section to manipulate the power conversion circuit to operate in one of the respective operation states determined as an actual operation state based on the controlled variable predicted by the prediction section. The control apparatus further includes an average voltage direction calculating section to calculate a direction of an average output voltage vector of the power conversion circuit. The manipulation section includes a priority setting section to set priority for each of the operation states based on the direction of the average output voltage vector calculated by the average voltage direction calculating section in determining the actual operation state.

20 Claims, 16 Drawing Sheets

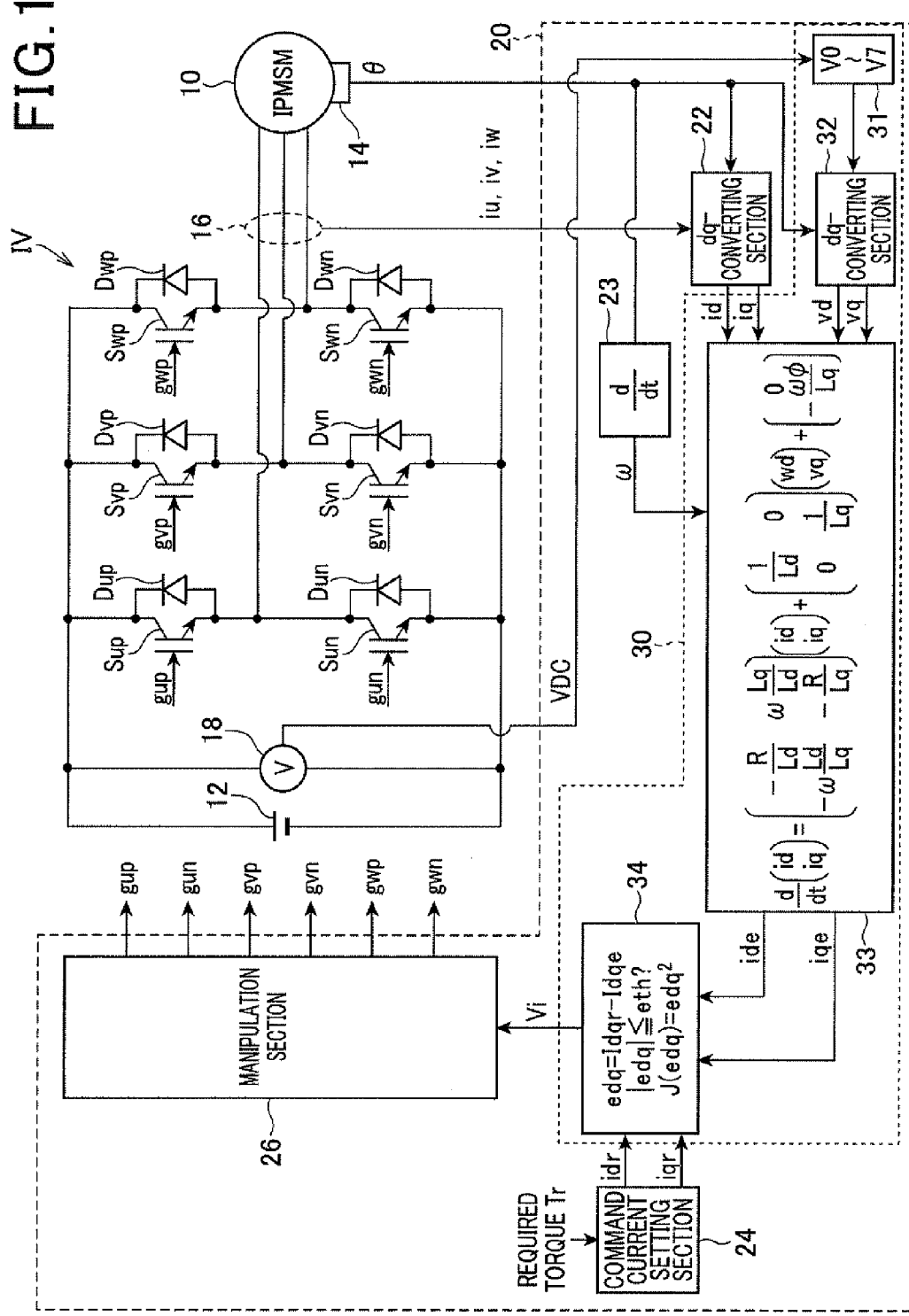

| VOLTAGE VECTOR | SWITCHING ELEMENT TO BE TURNED ON | | |
|---|---|---|---|
| | U-PAHSE | V-PAHSE | W-PAHSE |
| V0 | LOW SIDE | LOW SIDE | LOW SIDE |
| V1 | HIGH SIDE | LOW SIDE | LOW SIDE |
| V2 | HIGH SIDE | HIGH SIDE | LOW SIDE |
| V3 | LOW SIDE | HIGH SIDE | LOW SIDE |
| V4 | LOW SIDE | HIGH SIDE | HIGH SIDE |
| V5 | LOW SIDE | LOW SIDE | HIGH SIDE |
| V6 | HIGH SIDE | LOW SIDE | HIGH SIDE |
| V7 | HIGH SIDE | HIGH SIDE | HIGH SIDE |

$Va = (V\alpha a \quad V\beta a)$ $\theta va = \arctan\left(\dfrac{V\beta a}{V\alpha a}\right)$ S1: $0 \leq \theta va < \dfrac{\pi}{3}$ S2: $\dfrac{\pi}{3} \leq \theta va < \dfrac{2}{3}\pi$ S3: $\dfrac{2}{3}\pi \leq \theta va < \pi$ S4: $\pi \leq \theta va < \dfrac{4}{3}\pi$ S5: $\dfrac{4}{3}\pi \leq \theta va < \dfrac{5}{3}\pi$ S6: $\dfrac{5}{3}\pi \leq \theta va < 2\pi$

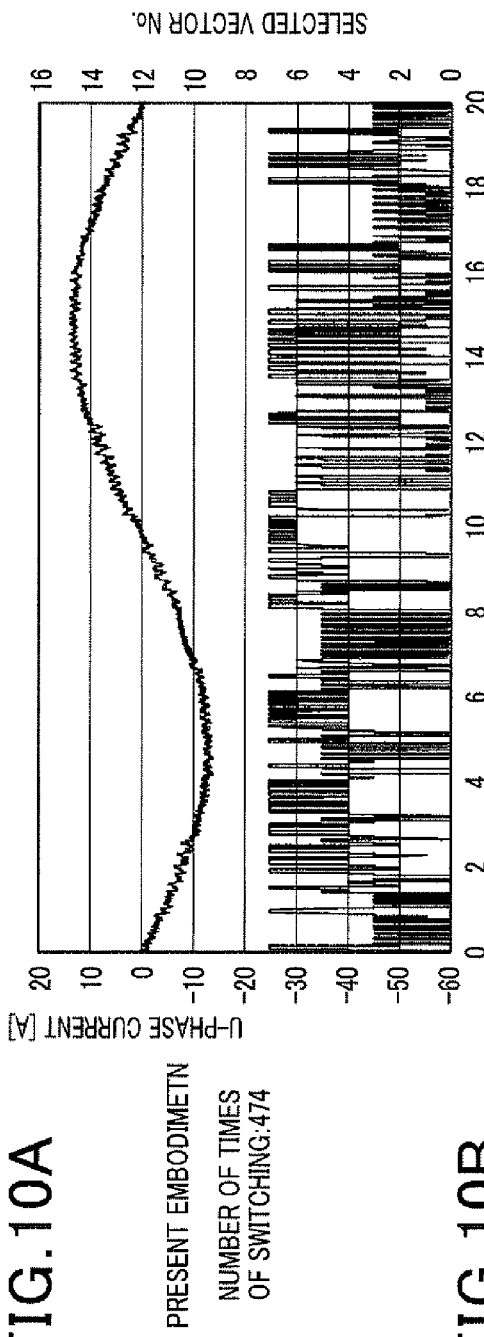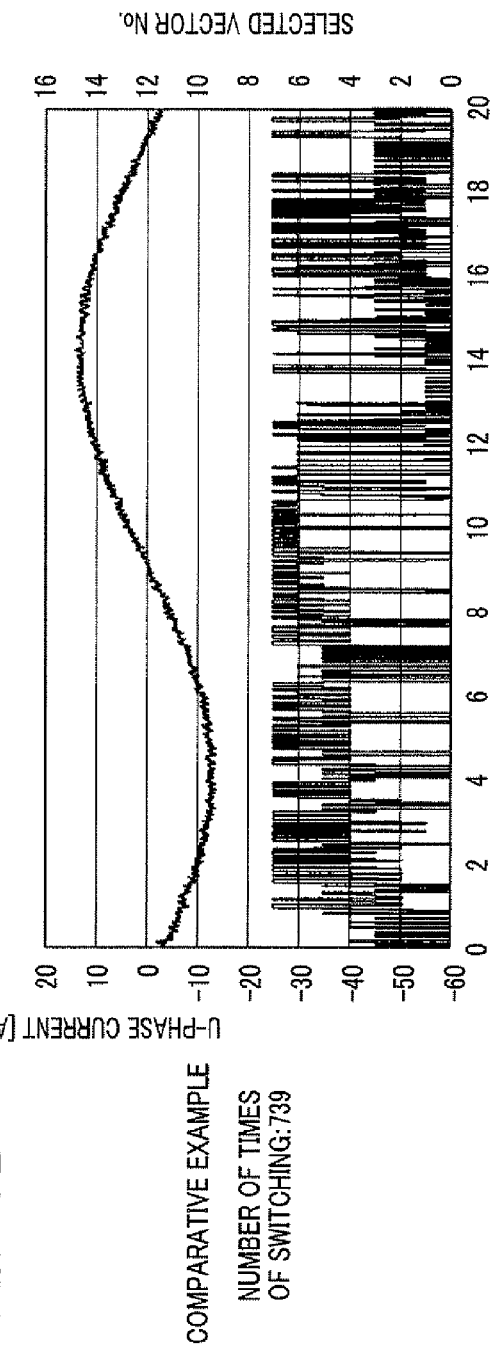

CONTROL APPARATUS FOR ELECTRIC ROTATING MACHINE

This application claims priority to Japanese Patent Application No. 2010-63038 filed on Mar. 18, 2010, the entire contents of which are hereby incorporated by reference.

BACKGROUND OF THE INVENTION

1. Field of the Invention

The present invention relates to a control apparatus for an electric rotating machine.

2. Description of Related Art

As described, for example, in Japanese Patent Application Laid-open No. 2006-174697, there is known a control apparatus which performs model predictive control to control an electric rotating machine. This control apparatus operates as follows. First, a sequence of switch states at sampling timings k, k+1, ... k+N−1 (N≧1) is provisionally set, and a prediction of a torque track is made for the sampling timings k to k+N. Next, a prediction of a torque track afterwards is made by extrapolation as a torque track at sampling timings k+N−1 to k+N. Next, the number of times of change of the switch state in the sequence provisionally set is divided by a number n indicative of the number of times of sampling performed until the torque predicted by the extrapolation deviates from a predetermined range. Next, a switch state at the sampling timing k of the switching sequence is determined as an actual switching state at the sampling timing k, if the quotient of the above division is the minimum of all the switching sequences provisionally set. According to the above model predictive control, the number of times of change of the switch state can be reduced.

In the above model predictive control, the quotient becomes smaller as the period of time elapsed until the torque predicted by the extrapolation deviates from the predetermined range becomes longer. Accordingly, the quotient becomes small even when the number of times of change of the switch state for the sampling timings k to k+N−1 state is large, if the number of the sampling times n is large. Hence, the above described conventional control apparatus cannot always sufficiently reduce the number of times of change of the switch state. Further, since the accuracy of torque prediction by extrapolation is not necessarily high, and accordingly the above described conventional control apparatus variably sets weighting factors used to evaluate the number of times of change of the switch state based on the inaccurate prediction of torque behavior, there is a problem in the reliability of the control.

SUMMARY OF THE INVENTION

An embodiment provides a control apparatus for an electric rotating machine comprising:

a prediction section to predict a controlled variable of the electric rotating machine applied with an output voltage of a power conversion circuit for each of prescribed operation states of the power conversion circuit including switching elements each connected to a corresponding one of terminals of the electric rotating machine and on/off-controlled to make and break electrical connection between a positive or a negative terminal of a DC power source and the corresponding one of the terminals of the electric rotating machine; and a manipulation section to manipulate the power conversion circuit to operate in one of the operation states as an actual operation state determined based on the controlled variable predicted by the prediction section, wherein the control apparatus further comprises an average voltage direction calculating section to calculate a direction of an average output voltage vector of the power conversion circuit, and the manipulation section includes a priority setting section to set priority for each of the operation states based on the direction of the average output voltage vector calculated by the average voltage direction calculating section in determining the actual operation state.

According to the present invention, there is provided a control apparatus for an electric rotating machine capable of substantially reducing the number of times of switch state change in performing model predictive control.

Other advantages and features of the invention will become apparent from the following description including the drawings and claims.

BRIEF DESCRIPTION OF THE DRAWINGS

In the accompanying drawings:

FIG. 1 is a diagram showing the structure of a control system for controlling a motor/generator, the control system including a control apparatus according to a first embodiment of the invention;

FIGS. 10A and 10B are time charts for explaining advantageous effects of the first embodiment;

PREFERRED EMBODIMENTS OF THE INVENTION

First Embodiment

Figures 2A, 2B:
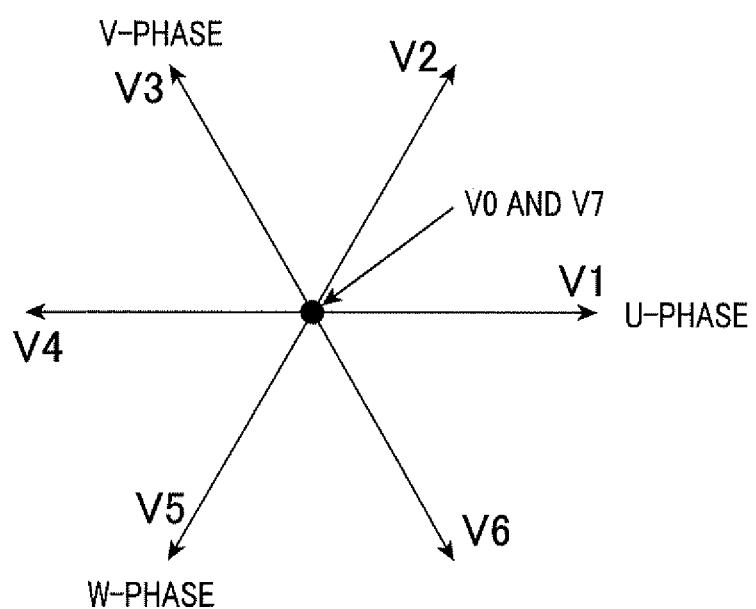
FIGS. 2A and 2B are diagrams explaining voltage vectors representing operation states of an inverter included in the control system.

FIG. 1 is a diagram showing the overall structure of a control system for controlling a motor/generator 10 mounted on a hybrid vehicle, the control system including a control apparatus 20 according to a first embodiment of the invention. The motor/generator 10 is a three-phase permanent magnet synchronous motor. The motor/generator 10 is also an electric rotating machine with salient poles. That is, the motor/generator 10 is an IPSM (Interior Permanent Magnet Synchronous Motor).

The motor/generator 10 is connected to a high voltage battery 12 through an inverter IV. The inverter IV includes a series connection of switching elements Sup and Sun, a series connection of switching elements Svp and Svn, and a series connection of switching elements Swp and Swn. The connection nodes of these series connections are respectively connected to the U-phase, V-phase and W-phase windings of the motor/generator 10. As each of the switching elements Sup, Sun, Svp, vn, Swp and Swn, an IGBT (Insulated Gate Bipolar Transistor) is used in this embodiment. The switching elements Sup, Sun, Svp, vn, Swp and Swn are respectively parallel-connected with diodes Dup, Dun, Dvp, Dvn, Dwp and Dwn.

The control system of this embodiment includes the following components to detect the operation states of the motor/generator 10 and the inverter IV. A rotational angle sensor 14 to measure a rotational angle (electrical angle θ) of the motor/generator 10. A current sensor 16 to detect the phase currents iu, iv and iw respectively flowing through the three phase windings of the motor/generator 10. A voltage sensor 18 to detect the input voltage (power supply voltage VDC) of the inverter IV.

The detected values from these sensors are inputted to the control apparatus 20 constituting a low-voltage system through an interface (not shown). The control apparatus 20 generates signals to manipulate the inverter IV based on the detected values received from these sensors. The signals to manipulate the inverter IV include manipulation signals gup, gun, gvp, gvn, gwp and gwn to manipulate the switching elements Sup, Sun, Svp, Svn, Swp and Swn, respectively.

The control apparatus 20 manipulates the inverter IV in order that the torque of the motor/generator 10 is controlled at a required torque Tr. More specifically, the control apparatus 20 manipulates the inverter IV in order that the current flowing through the motor/generator 10 is controlled at a command current so that the motor/generator 10 generates the required torque Tr. In this embodiment, although the torque of the motor/generator 10 is a final controlled variable, the input current of the motor/generator 10 as an immediate controlled variable is controlled at the command current. More specifically, to control the input current of the motor/generator 10 at the command current, the control apparatus 20 performs model predictive control where the input current of the motor/generator 10 is predicted for several operation states of the inverter IV provisionally set, and the actual operation state of the inverter IV is determined based on the difference between each of the predicted input currents and the command current. The model predictive control is explained in detail below.

The phase currents iu, iv and iw detected by the current sensor 16 are converted into actual currents id and iq in a rotating coordinate system by a dq-converting section 22. The electrical angle θ detected by the rotational angle sensor 14 is inputted to a speed calculating section 23. The speed calculating section 23 calculates the rotational speed (electrical angular velocity ω) of the motor/generator 10 based on the electrical angle θ.

A command current setting section 24 outputs command currents idr and iqr in a dq-coordinate system in accordance with the required torque Tr inputted thereto. The command currents idr and iqr, the actual currents id and iq, and the electrical angle θ are inputted to a model predictive control section 30 as input parameters. The model predictive control section 30 determines a voltage vector Vi to specify the operation state of the inverter IV based on these input parameters. The voltage vector Vi is inputted to a manipulation section 26 which generates the manipulation signals to be supplied to the inverter IV.

The operation state of the inverter IV is represented by eight voltage vectors V0 to V7 shown in FIG. 2A. For example, the voltage vector V0 represents a state where the switching elements Sun, Svn and Swn on the low voltage side (distinguished by "LOW SIDE" in FIG. 2A) are on, and the voltage vector V7 represents a state where the switching elements Sup, Svp and Swp on the high voltage side (distinguished by "HIGH SIDE" in FIG. 2A) are on. The voltage vectors V0 and V7 are for causing the voltages applied to the motor/generator 10 by the inverter IV to be zero for short-circuiting all the phases of the motor/generator 10. Accordingly, they are called a zero voltage vector. Each of the other voltage vectors V1 to V6 is for specifying a state in which at least one of the upper arms (the switching elements on the high voltage side) and at least one of the lower arms (the switching elements on the lower voltage side) are on. Accordingly, they are called an effective voltage vector. FIG. 2B is a diagram showing the effective voltage vectors V1 to V6 on the fixed two-dimensional coordinate system whose origin is defined by the zero voltage vectors V0 and V7. As shown in FIG. 2B, the voltage vectors V1, V3 and V5 represent the states in each of which the switching element on the high voltage side of one of the U, V and W phases is on.

Next, the operation of the model predictive control section 30 is explained. An operation state setting section 31 shown in FIG. 1 sets one of the voltage vectors V0 to V7 shown in FIG. 2B as the operation state of the inverter IV. A dq-converting section 32 dq-converts the voltage vector set by the operation state setting section 31 into a voltage vector Vdq=(vd, vq) in the dq-coordinate system. This conversion can be performed by replacing "HIGH SIDE" and "LOW SIDE" with "VDC/2" and "−VDC/2", respectively for each of the voltage vectors V0 to V7 shown in FIG. 2A. For example, the voltage vector V0 is converted into (−VDC/2, −VDC/2, −VDC/2), and the voltage vector V1 is converted into (VDC/2, −VDC/2, −VDC/2).

A prediction section 33 predicts actual currents id and iq for the operation state of the inverter IV set by the operation state setting section 31 based on the voltage vector (vd, vq), the present actual currents id and iq, and the electrical angular velocity ω. Here, the following voltage equations (c1) and (c2) are solved with respect to the derivative terms of the currents to obtain the following state equations (c3) and (c4), and the currents one step ahead are predicted by discretizing the obtained state equations (c3) and (c4).

$$Vd = (R + pLd)id - \omega Lq\, iq \qquad (c1)$$

$$Vq = \omega Ld\, id + (R + pLq)iq + \omega \phi \qquad (c2)$$

$$Pid = (R/Ld)id + \omega(Lq/Ld)iq + vd/Ld \qquad (c3)$$

$$Piq = -\omega(Ld/Lq)id - (Rd/Lq)iq + vq/Lq - \omega\phi/Lq \qquad (c4)$$

In the equations (c1) and (c2), R denotes the resistance, p denotes a differential operator, Ld denotes the d—axis inductance, Lq denotes the q-axis inductance, and φ denotes the linkage flux constant.

The prediction of the currents is performed for each of the operation states set by the operation state setting section 31.

An operation state determining section 34 determines the operation state of the inverter IV from the currents ide and iqe predicted by the prediction section 33, and the command currents idr and iqr inputted thereto. In this embodiment, the operation state determining section 34 uses an evaluation function J to make the determination. Each of the operation states set by the operation state setting section 31 is evaluated by use of the evaluation function J, and the operation state having the highest evaluation is selected. In this embodiment, as the evaluation function J, there is adopted such a function that the output value thereof is larger when the evaluation is lower. More specifically, the evaluation function J calculates an inner product between the command current vector Idqr= (idr, iqr) and the predicted current vector Idqe=(ide, iqe). This is because the difference between the command current vector Idqr and the predicted current vector Idqe takes both a positive value and a negative value. Hence, the evaluation by the evaluation function J becomes lower when the difference between the command current vector Idqr and the predicted current vector Idqe becomes larger.

Using the evaluation function J makes it possible to select one of the operation states, which minimizes the difference between the predicted current vector Idqe and the command current vector Idqr in every control cycle Tc. However, using the evaluation function J may also increase the number of the phases of the motor/generator 10 which are switched at the same time for a switch state change. In this case, since a large surge voltage occurs, the switching elements are required to have a high withstand voltage.

Figure 3:
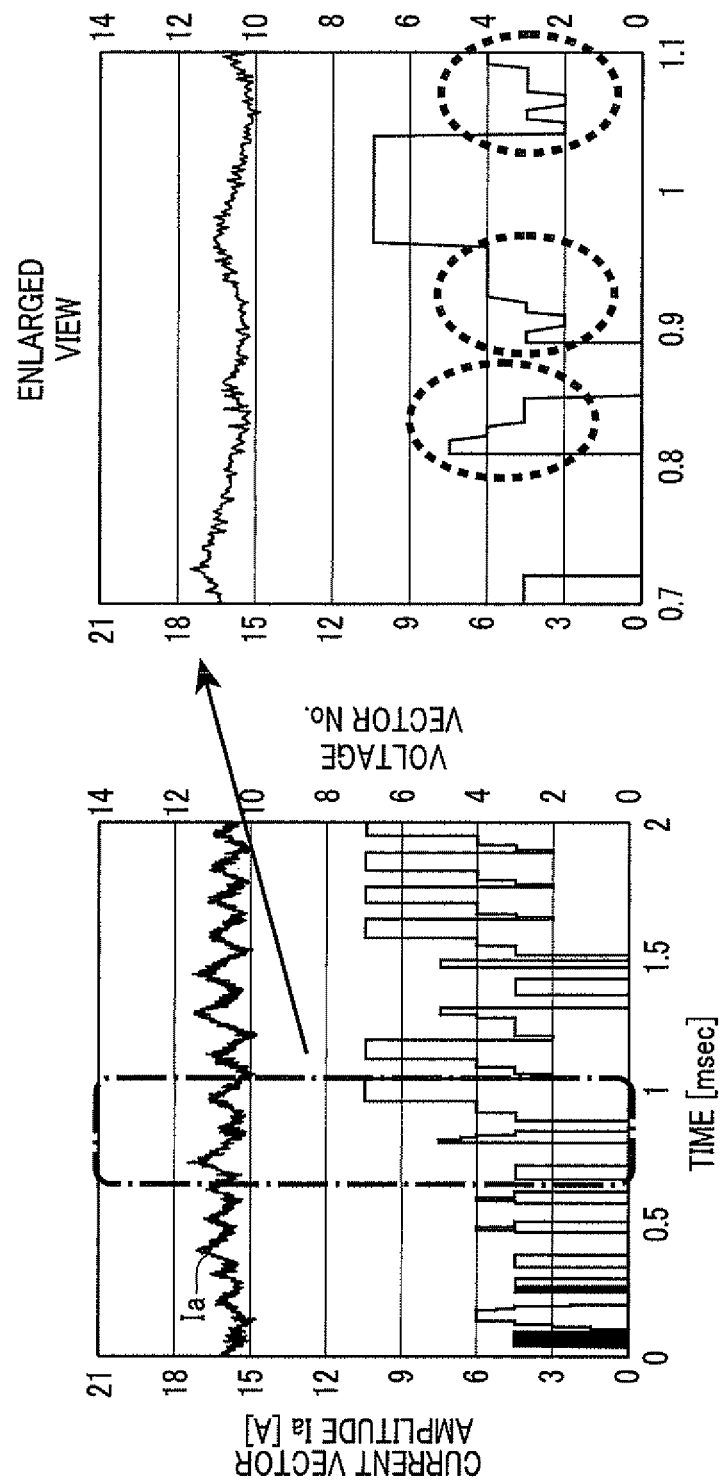
FIG. 3 is a time chart showing a problem in conventional model predictive control.
Figure 4A:
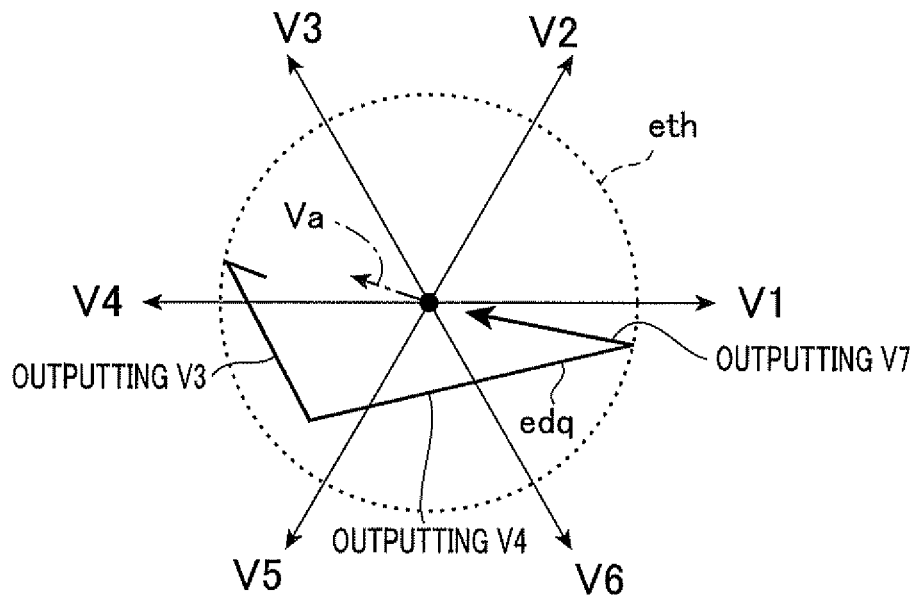
FIGS. 4A and 4B are diagrams for comparison between conventional triangular wave comparison PWM control and the conventional model predictive control.

Initially, the inventors studied a control method which makes it possible that the number of the phases which are switched at the same time for a switch state change is limited within 1. More specifically, the inventors have studied a process in which this limitation is enforced when the difference between the command current and the predicted current is within an allowable range, and when the difference is outside the allowable range, one of all the operation states, which is given the highest evaluation by the evaluation function J is selected. FIG. 3 is a diagram showing an example of the switch state change by this process. It was found from FIG. 3 that, in this process, since the frequency of change between the operation states represented by different effective voltage vectors is high, the number of times of the switch state change performed per unit time is high. FIG. 4A is a diagram showing an example of the switch state change by a conventional triangular-wave comparison PWM process.

As shown in FIG. 4A, in the conventional triangular-wave comparison PWM, the end point of an error vector edq (whose start point is at the origin point) formed by subtracting the actual current vector Idq from the command current vector Idqr varies depending on a pattern of periodical switching between two effective voltage vectors and one zero voltage vector. An average voltage vector Va is also shown in FIG. 4A.

The average voltage vector Va represents a fundamental component having a certain the electrical angular frequency of the output voltage of the inverter IV. The inverter IV changes the switch state at intervals shorter than one electrical angle cycle, so that the output voltage of the inverter IV follows a sine wave of a component of the electrical angular frequency. The average voltage vector Va corresponds to the voltage of the sine wave shape outputted from the inverter IV.

The norm of the average voltage vector Va is a physical value which is in proportion to a modulation index or a voltage usage factor. Here, the modulation index corresponds to the Fourier coefficient of the fundamental component of the output voltage of the inverter IV. In this embodiment, to calculate this Fourier coefficient, the amplitude center of the fundamental wave and the center of variation of the output voltage of the inverter IV are aligned with each other.

The end point of the error vector edq deviates in the direction of the vector formed by subtracting the voltage vector representing the operation state of the inverter IV from the average voltage vector Va. Accordingly, when the vector representing the operation state of the inverter IV is the zero voltage vector, the end point of the error vector edq deviates in the direction of the average voltage vector Va. Particularly, in the triangular wave comparison PWM process, a period in which the inverter IV is set in the operation state represented by the zero voltage vector is long, because the operation state represented by the zero voltage vector is selected when the end point of the error vector edq is within the area which is 180 degrees opposite to the area surrounded by two effective voltage vectors (V3 and V4 in FIG. 4A) which make the smallest angles with the average voltage vector Va when the start points of the effective voltage vectors and the average voltage vector Va are to the start point of the error vector edq. In addition, a period in which the actual current is larger than the command current and a period in which the actual current is smaller than the command current alternate with each other, because the end point of the error vector edq deviates from the area surrounded by the two effective voltage vectors, and the norm of the error vector edq increases to some extent, as a result of which the operation state represented by the zero voltage vector is changed to the operation state represented by the effective voltage vectors. Accordingly, it is possible that the average current over one period of this pattern well follows the command current.

Figure 4B:
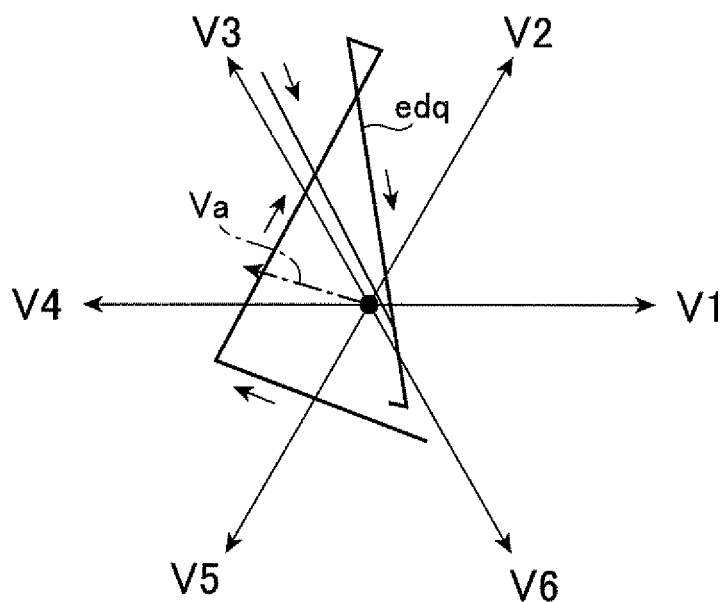

FIG. 4B is a diagram showing an example of the switch state change by a model predictive control. In this example, the switch state is switched frequently. This is because the switch state given the highest evaluation by the evaluation function J is selected at every control cycle. As explained above, when a model predictive control is used, there is a tendency that the number of times that the switch state is changed increases because of the reason that an optimum solution is searched in a microscopic time scale. However, this is not inevitable in a model predictive control.

If the prediction period is prolonged, for example, by predicting the operation state at the next control cycle Tc based on predicted currents of two or more control cycles ahead, it is possible to restrain the tendency that an optimum solution is searched in a microscopic time scale. However, in this case, computation load of the control apparatus 20 increases. Incidentally, the error vector edq shown in FIG. 4B is formed by subtracting the actual current vector Idq from the command current vector Idqr.

In view of the above, the inventors thought of referring to the average voltage vector Va to determine the operation state at the next control cycle Tc. The average voltage vector Va is appropriate to set the current actually flowing through the motor/generator 10 as the command currents idr and iqr. Accordingly, the inventors thought that referring to the average voltage vector Va would make it possible to select the optimum operation state in a time scale longer than the control cycle period Tc without prolonging the prediction period by model predictive control.

Figure 5A:
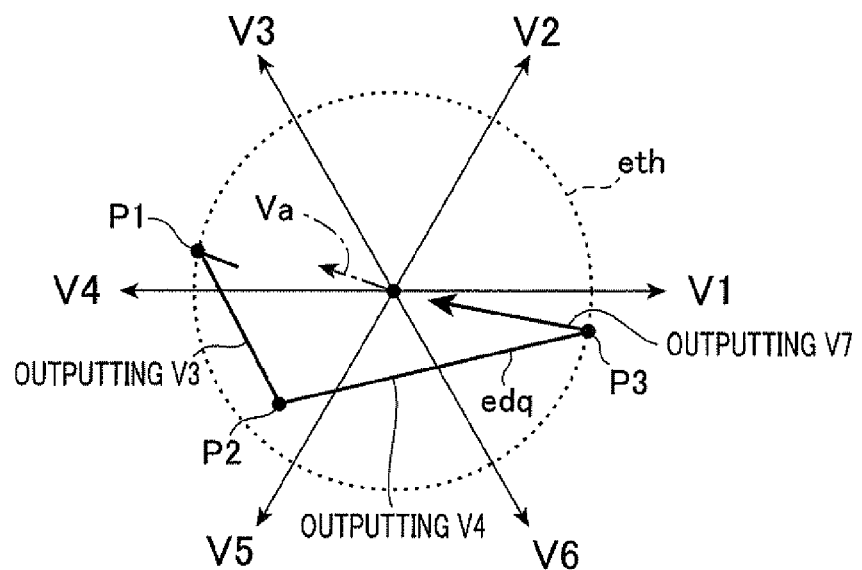
FIGS. 5A and 5B are diagrams showing an example of transition of the switch state of the inverter in the first embodiment.

FIG. 5A is a diagram showing an example of transition of the operation state selected by the model predictive control performed in this embodiment. As shown in FIG. 5A, one of the two effective voltage vectors making the smallest angles with the average voltage vector Va is selected (V3 in FIG. 5A) at a point P1 where the current error exceeds an allowable range (where the norm of the error vector edq becomes larger than a threshold value eth). Afterwards, the other of the two effective voltage vectors (V4 in FIG. 5A) is selected at a point P2. Thereafter, at a point P3 where the current error again exceeds the allowable range (where the norm of the error vector edq becomes larger than the threshold value eth), the zero voltage vector (V7 in FIG. 5A) is selected. Hence, as in the case of using the triangular-wave PWM process, duration of the operation state represented by the zero voltage vector can be prolonged, thereby reducing the number of times of the switch state change.

The point P2 should be set to a point appropriate for controlling the point P3 within the area which is 180 degrees opposite to the area surrounded by two effective voltage vectors making the minimum angles with the average voltage vector Va. In view of the above, in this embodiment, the point P2 is set to a time point at which the magnitude relationship between the norm |Idqr| of the command current vector Idqr and the norm |Idqe| of the predicted current vector Idqe reverses.

Next, the operation of the model predictive control in this embodiment is explained. The operation is performed repeatedly at time intervals of the control cycle Tc.

First, in step S10, the voltage vector (n) representing the present (this time) operation state is provisionally set as the voltage vector V(n+1) representing the operation state at the next update timing (at the next one of the update timings coming at intervals of the control cycle Tc). In subsequent step S12, a prediction process is performed to calculate the predicted current vector Idqe (n+2) at the timing one control cycle Tc ahead of the next update timing.

Figure 7:
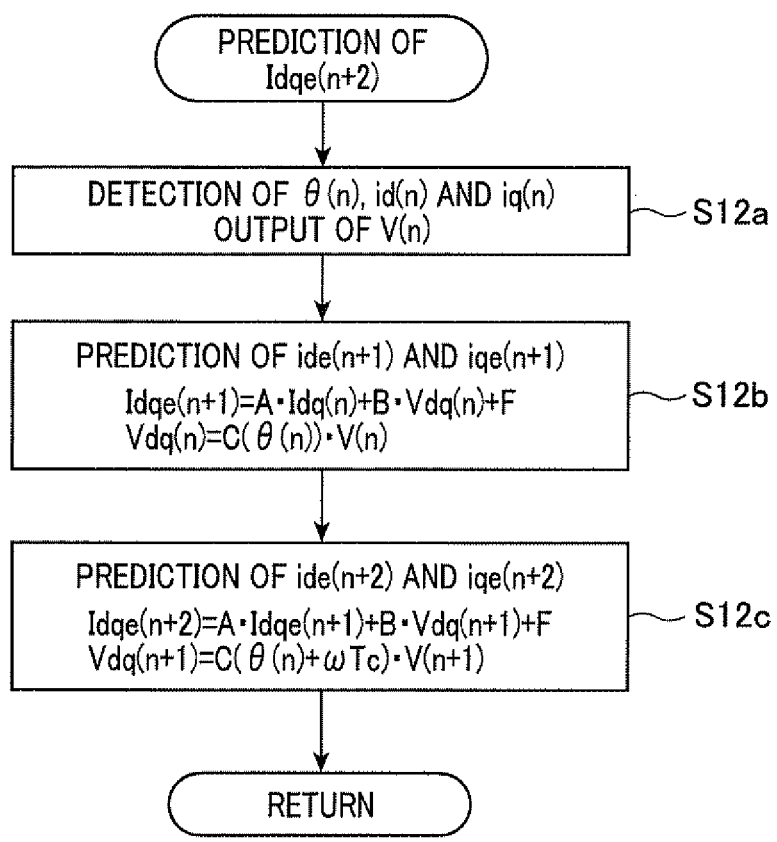
FIG. 7 is a flowchart showing a current prediction process in the model predictive control shown in FIG. 6.

This prediction process is explained in more detail with reference to the flowchart shown in FIG. 7.

This prediction process begins at step S12a where the electrical angle θ(n), and the actual currents id(n) and iq(n) are detected, and the voltage vector V(n) determined at the previous control cycle Tc is outputted. In subsequent step S12b, the currents (ide(n+1), iqe(n+1)) one control cycle ahead are predicted. Step S12b is for predicting the currents at the time one control cycle ahead based on the voltage vector V(n) outputted in step S12a. Here, the currents ide(n+1) and iqe(n+1) are calculated using the model represented by the foregoing equations (c3) and (c4) and discretized at intervals of the control cycle Tc by a forward difference method. In this calculation, the actual currents id(n) and iq(n) detected in step S12a are used as initial values of the currents, and the voltage vector V(n) dq-converted in accordance with the electrical angle θ(n) detected in step S12a is used as the voltage vector in the dq-axes.

In subsequent step S12c, the currents two control cycles ahead when the voltage vector V(n+1) is set for the next update timing are calculated. That is, the predicted currents ide(n+2) and iqe(n+2) are calculated in the same way as in step S12b. However, in this calculation, the predicted currents ide(n+1) and iqe(n+1) calculated in step S12b are used as initial values of the currents, and the voltage vector V(n+1) dq-converted in accordance with an angle equal to the electrical angle θ(n) detected in step S12a and added by ωTc is used as the voltage vector in the dq-axes. After completion of step S12c, a return is made to the operation shown in FIG. 6.

Figure 6:
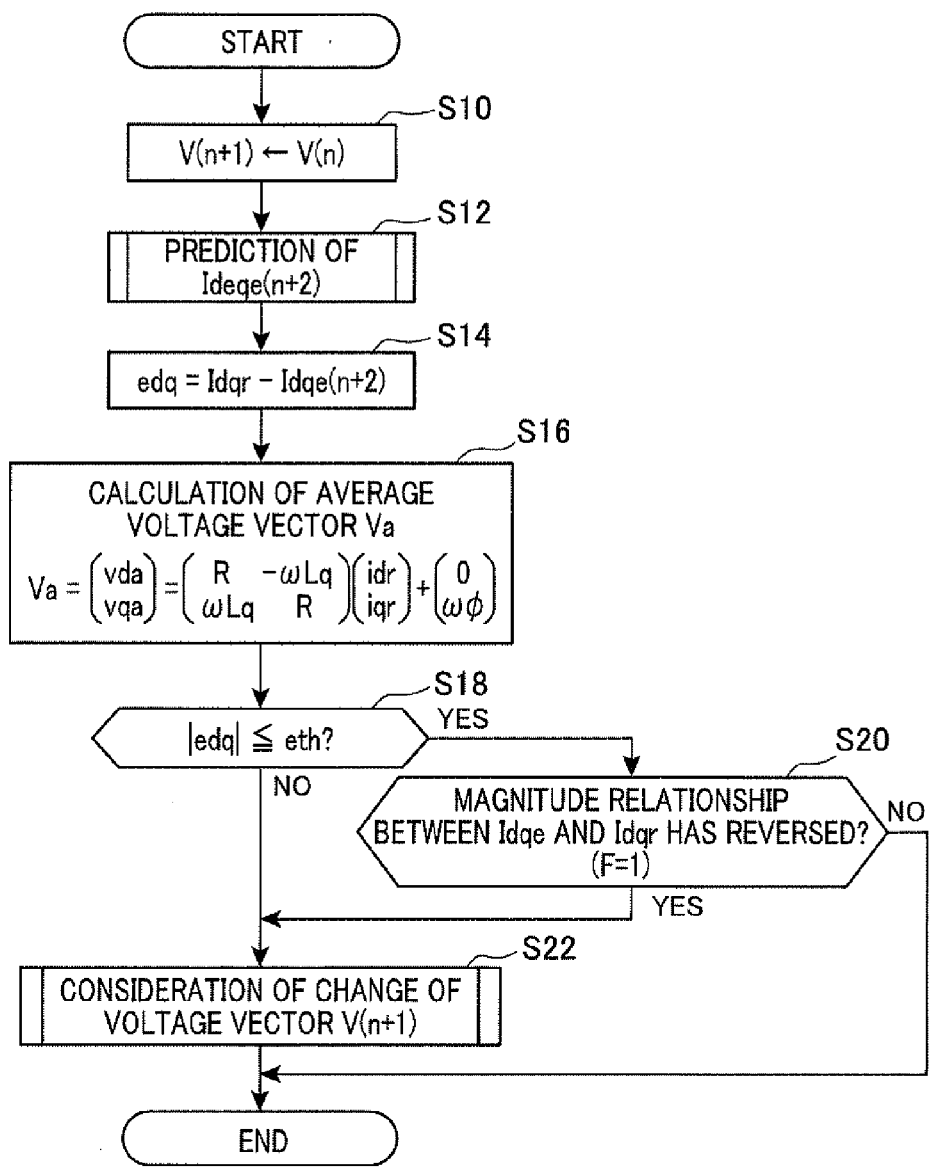
FIG. 6 is a flowchart showing the operation of the model predictive control performed by the control apparatus of the first embodiment.

In step S14 shown in FIG. 6, the error vector edq is calculated by subtracting the predicted current vector idqe(n+2) from the command current vector Idqr. In subsequent step S16, the average voltage vector Va is calculated. Here, the average voltage vector Va is calculated by substituting the command current vector Idqr into the foregoing equations (c1) and (c2) eliminated with the differential operator p. That is, since the average of the current flowing through the motor/generator 10 is the command currents idr and iqr except for ripples due to change of the switch state, a voltage applied to the motor/generator 10 when the command currents idr and iqr flow steadily is calculated as the average voltage vector Va.

In subsequent step S18, it is determined whether or not the current error is within the allowable range (whether or not the norm |edq| of the error vector edq is smaller than or equal to the threshold value eth). It is preferable that the threshold value eth is variably set depending on the state variable of the motor/generator 10 (the amplitude of the current or electrical angular velocity ω, for example). If the determination result in step S18 is affirmative, the operation proceeds to step S20 to determine whether or not the magnitude relationship between the norm |Idqr| of the command current vector Idqr and the norm |Idqe| of the predicted current vector Idqe has reversed. If the determination result in step S20 is affirmative, a state transition permission flag F is set to 1 on condition that the present voltage vector V(n) is one of the two effective voltage vectors forming the smallest angles with the average voltage vector Va.

Figure 8:
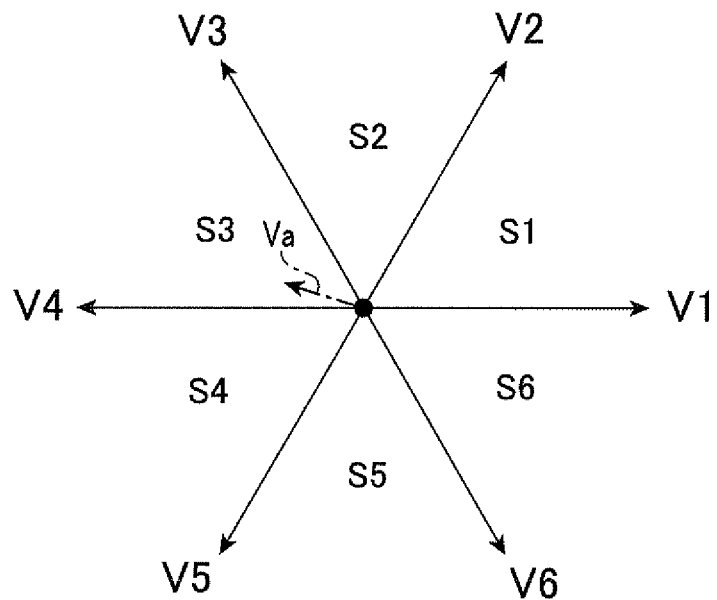
FIG. 8 is a diagram showing a process for identifying an area of an average voltage vector in the model predictive control shown in FIG. 6.

The determination whether this condition is satisfied can be made by a process to identify an area in which the average voltage vector Va is present. In more detail, the determination can be made by identifying in which of the areas S1 to S6 each surrounded by adjacent two of the effective voltage vectors V1 to V6 the average voltage vector Va is present, when the average voltage vector Va and the effective voltage vectors V1 to V6 share a common start point. Here, one of the areas S1 to S6 in which the average voltage vector Va is present is identified by calculating the angle θva between the average voltage vector Va and the voltage vector V1 based on the coordinate components (Vα, Vβ) of the average voltage vector Va coordinate-transformed from the rotating two dimensional coordinate system into the fixed two dimensional coordinate system (αβ coordinate system). As shown in FIG. 8, each of the areas S1 to S6 has an angular width of π/3.

By identifying the area in which the average voltage vector Va is present within the areas S1 to S6, the two effective voltage vectors making the smallest angles with the average voltage vector Va are self-determined.

If the determination result in step S18 is negative, or if the determination result in step S20 is affirmative, the operation proceeds to step S22 to consider change of the voltage vector V(n+1) at the next update timing. When step S22 is completed, or if the determination result in step S20 is negative, the operation is terminated.

Figure 9:
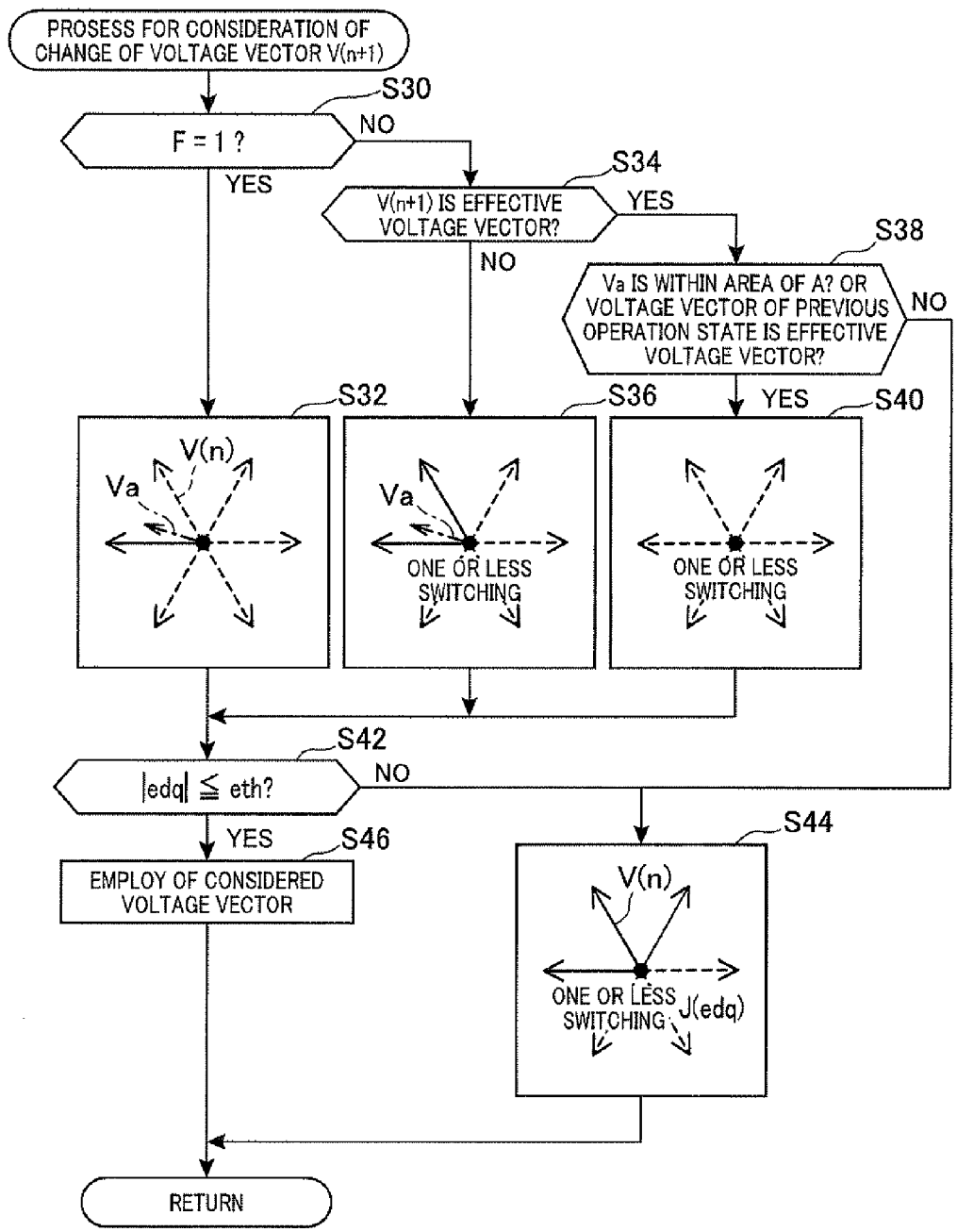
FIG. 9 is a flowchart showing a process to consider change of the voltage vector in the model predictive control shown in FIG. 6.

Next, the process performed in step S22 is explained in detail with reference to FIG. 9.

This process begins by determining whether or not the state transition permission flag F is 1 in step S30. If the determination result in step S30 is affirmative, the process proceeds to step S32. In step S32, the process regards one of the two effective voltage vectors making the smallest angles with the average voltage vector Va, which is not the present voltage vector V(n) (the vector shown by the solid line in FIG. 9), as having the highest priority as a replacement of the present voltage vector (Vn), and sets it as an object of consideration.

Figure 5B:
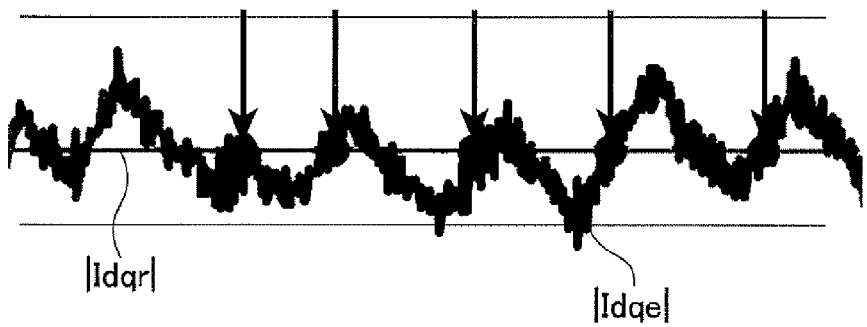

On the other hand, if the determination result in step S30 is negative, the process proceeds to step S34 to determine whether or not the present voltage vector V(n) is the effective voltage. Step S30 is for giving priority to a specific one of the voltage vectors at the point P1 shown in FIG. 5. That is, if the determination result in step S34 is negative, the process proceeds to step S36 where the process regards one of the two effective voltage vectors making the smallest angles with the average voltage vector Va as having the highest priority, which represents the operation state achievable from the present operation state V(n) through switching of one or less phase, and sets it as an object of consideration. For example, if the two effective voltage vectors are the effective voltage vectors V3 and V4, and the present voltage vector is the zero voltage vector V0, the effective voltage vector V3 is set as an object of consideration, because the operation state represented by the effective voltage V3 can be achieved through switching of one phase and the operation state represented by the effective voltage V4 can be achieved through switching of two phases.

On the other hand, if the determination result in step S34 is affirmative, the operation proceeds to step S38 to determine whether the logical OR of a first condition and a second condition is true, the first condition being that there is present the effective voltage vector Vi making an angle of A ($\leqq 20$ degrees) with the average voltage vector Va, the second condition being that the previous voltage vector immediately before switch to the present voltage vector V(n) was the effective voltage vector. The second condition is for giving priority to the zero voltage vector at the point P3 shown in FIG. 5. The first condition is for giving priority to the zero voltage vector in view of that, when there is present the effective voltage vector Vi making a sufficiently small angle with the average voltage vector V, the effective voltage vector Vi hardly contributes to forming the average voltage vector Va. If the determination result in step S34 is affirmative, the process proceeds to step S40 where the process regards the operation state represented by the zero voltage vector which can be achieved from the present operation state through switching of one or less phase as having the highest priority, and sets it as an object of consideration. For example, when the present voltage vector (Vn) is V4, the operation state represented by the zero voltage vector V7 is set as an object of consideration, and when the present voltage vector (Vn) is V3, the operation state represented by the zero voltage vector V0 is set as an object of consideration.

When step S32, S36 or S40 is completed, the process proceeds to step S42. In step S42, the predicted current Idqe vector (n+2) is calculated for the case where the operation state represented by the voltage vector set as an object of consideration is provisionally set, and it is determined whether or not the norm edq of the error vector edq is smaller than or equal to the threshold value eth for this case. If the determination result in step S42 is affirmative, the process proceeds to step S46 to employ the voltage vector set as an object of consideration.

On the other hand, if the determination result in step S42 or step S38 is negative, the process proceeds to step S44 where of all the voltage vectors representing operation states achievable from the operation state represented by the present voltage vector V(n) through switching of one or less phase, the one given the highest evaluation by the evaluation function J is adopted. For example, when the present vector V(n) is the effective voltage vector V3, of the effective voltage vectors V2, V3 and V4 and the zero voltage vector V0, the one given the highest evaluation by the evaluation function J is adopted.

When step S46 or S44 is completed, the process is terminated.

Next, the advantages of the above described first embodiment are explained with reference to FIGS. 10A and 10B. FIG. 10A shows an example of transitions of the U-phase current and the voltage vectors of the motor/generator 10 in this embodiment. FIG. 10B shows a comparative example of transitions of the U-phase current and the voltage vectors when the conventional model predictive control explained with reference to FIG. 3 is performed. As seen from FIGS. 10A and 10B, according to this embodiment, the number of times of the switch state change can be significantly reduced.

Figure 11A:
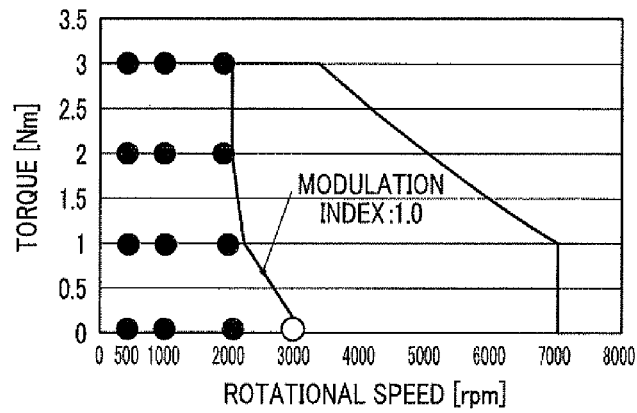
FIGS. 11A to 11C are diagrams showing advantageous effects of the first embodiment.
Figure 11B:
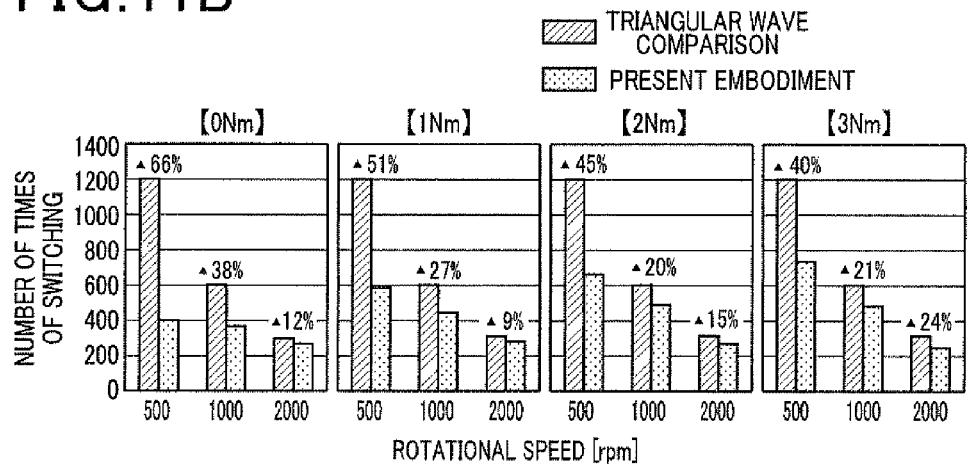
Figure 11C:
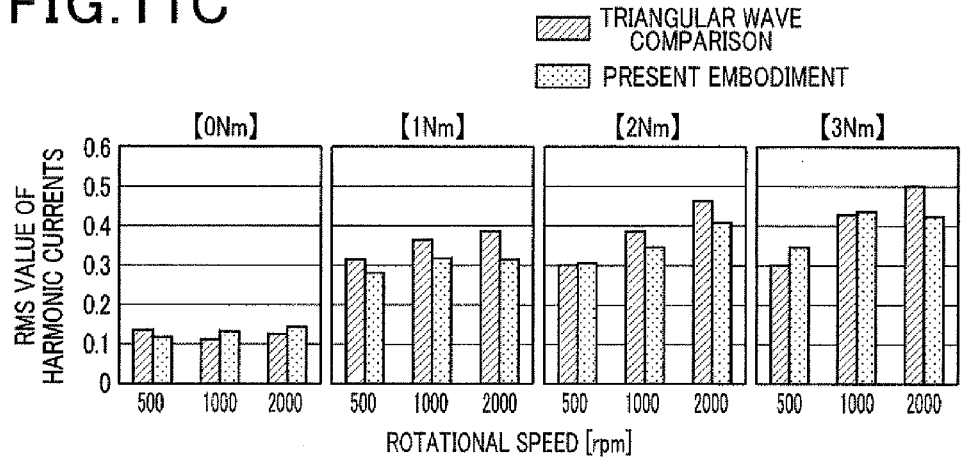

Next, an example of operation of the motor/generator 10 of this embodiment is explained in comparison to a case where the triangular wave comparison PWM process is used. FIG. 11A shows points at which measurements of the number of times of the switch state change and the U-phase current were performed. FIG. 11B shows measured number of times of the switch state change at the respective measurement points. FIG. 11C shows measured RMS values of the high-frequency components of the U-phase current at the respective measurement points. FIGS. 11B and 11C show average values at each of four diriment torques for each of three different rotational speed shown in FIG. 11A. Each of the RMS values shown in FIG. 11C is calculated by integrating a square root of a difference between the actual U-phase current and the command value over one cycle period in electrical angle.

As shown in these figures, according to this embodiment, the number of times of the switch state change can be reduced compared to the case where the triangular wave comparison PWM process is used. In addition, according to this embodiment, the RMS values are the same or less than those in the case where the triangular wave comparison PWM process is used.

Figure 12:
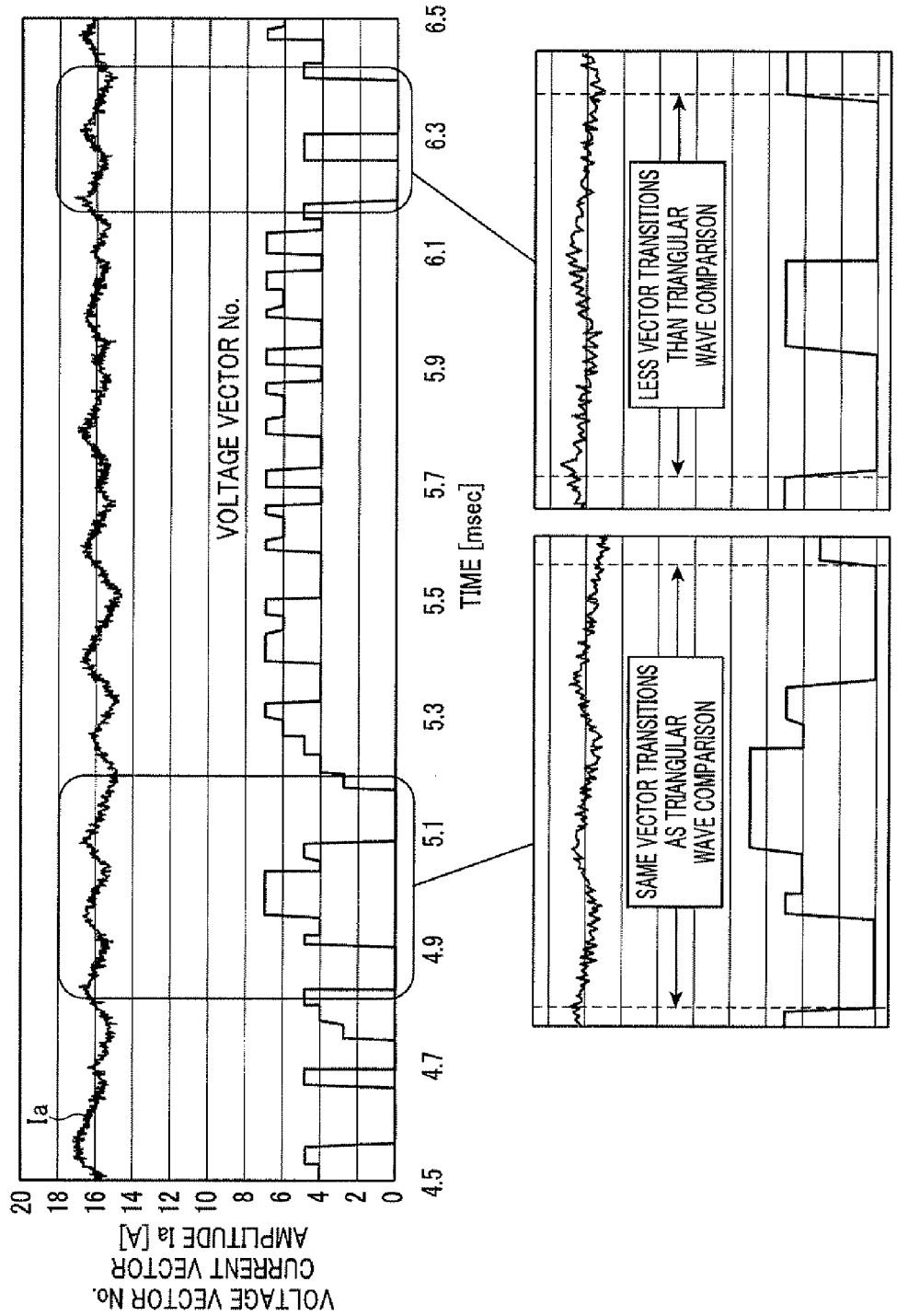
FIG. 12 is a time chart for explaining advantageous effects of the first embodiment.

FIG. 12 is a diagram showing an example of the switch state change in this embodiment. As shown in FIG. 12, the voltage vector changing frequency in this embodiment is the same as or lower than that in the case of the triangular wave comparison PWM process is used.

The first embodiment described above provides the following advantages.

(1) Priority is set for determining an actual operation state of the inverter IV in accordance with the direction of the average voltage vector Va. This makes it possible to determine the optimum operation state of the inverter IV in terms of a time scale longer than the time scale of the control cycle Tc.

(2) The present operation state is given the highest priority on condition that the current error is within the allowable range (the norm |edq| of the error vector edq is smaller than the threshold value eth). This makes it possible to reduce the number of the operation state changes.

(3) The operation state represented by the zero voltage vector is given the highest priority when a logical product of two conditions is true, one condition being that the voltage vector representing the operation state determined to be an object of prediction is the effective voltage vector when the current error is determined to exceed the allowable range (when the norm |edq| of the error vector edq is determined to be larger than the threshold value eth), the other condition being that the voltage vector representing the previous operation state is the effective voltage vector. This makes it possible to restrict the error within the allowable range using the zero voltage vector for a long period of time.

(4) The operation state represented by the zero voltage vector is given the highest priority when the logical product of two conditions is true, one condition being that the voltage vector representing the operation state determined to be an object of prediction is the effective voltage vector when the error current is determined to exceed the allowable range (when the norm edq of the error vector edq is determined to be larger than the threshold value eth), the other condition being that of the effective voltage vectors, there is one that makes an angle smaller than a predetermined angle A with the average voltage vector Va. This makes it possible to restrict the error within the allowable range using the zero voltage vector for a long period of time.

(5) Of the operation states represented by the two effective voltage vectors making the smallest angles with the average voltage vector Va when the error current is determined to exceed the allowable range (when the norm |edq| of the error vector edq is determined to be larger than the threshold value eth), the one that can be achieved through switching of one or less phase is given the highest priority. This makes it possible to give priority to the effective voltage vector appropriate for restricting the current error within the allowable range.

(6) One of the two effective voltage vectors each adjacent to the average voltage vector Va, which does not represent the present operation state, is given the highest priority when the magnitude relationship between the norm |Idqr| of the command current vector Idqr and the norm |Idqe| of the predicted voltage vector Idqe reverses. This makes it possible to control the end point of the error vector edq to be present in the area 180 degrees opposite to the area in which the average voltage vector Va is present.

(7) Of the operation states which can be achieved through switching of one or less phase of the motor/generator 10, the one that is given the highest priority by the evaluation function J is set as the next operation state, when the difference between the command value and the predicted value for the operation state given the highest priority is not within the allowable range. This makes it possible to select one of the operation states which is appropriate for reducing the number of times of the switch state change, when it is not possible to restrict the error within the allowable range for the operation state given the highest priority.

(8) Of the operation states each of which can be achieved through switching of one or less phase of the motor/generator 10, the one that is given the highest priority by the evaluation function J is set as the next operation state, when the difference between the command value and the predicted value for the operation state determined to be an object of prediction because of being achievable through switching of one or less phase of the motor/generator 10 is not within the allowable range. This makes it possible to select one of the operation states which is appropriate for reducing the number of times of the operation state change, when an unexpected behavior has occurred.

(9) Change of the operation state is inhibited if it requires switching of two or more phases of the motor/generator 10. This makes it possible to reduce surge voltage at the time of changing the operation state.

(10) Any operation state is excluded from an object of prediction, if it requires switching of two or more phases of the motor/generator 10 to be achieved. This makes it possible to reduce the computation load of the control apparatus.

(11) The average voltage vector Va is calculated from the command currents idr and iqr. This makes it possible to appropriately calculate the direction of the average output voltage vector.

(12) The initial value of the current is predicted based on the operation state determined to be set as the operation state of the inverter IV. This makes it possible to accurately predict the current under the mode prediction control.

(13) The value of the current (ide(n+1), iqe(n+1)) at the next update timing n+1 is predicted from the detected current value (id (n), iq(n)). This makes it possible to accurately predict the current.

(14) The operation state at the next update timing is determined based on the predicted value of the current at a time after lapse of one control cycle Tc from the next update timing n+1 of the operation state. This makes it possible to appropriately determine the operation state of the inverter IV.

(15) To predict the initial current value at the next update timing of the set operation state, the current (id(n), iq(n)) detected at the present update timing is used. This makes it possible that the process for prediction of the current at the next update timing in setting the operation state, and the process to predict the initial value of the current in this prediction can be made substantially the same as each other. This facilitates the design work of the prediction process means, and enables sharing computation programs for the prediction process means.

Second Embodiment

Next, a second embodiment of the invention is described with particular emphasis on the difference with the first embodiment.

Figure 13:
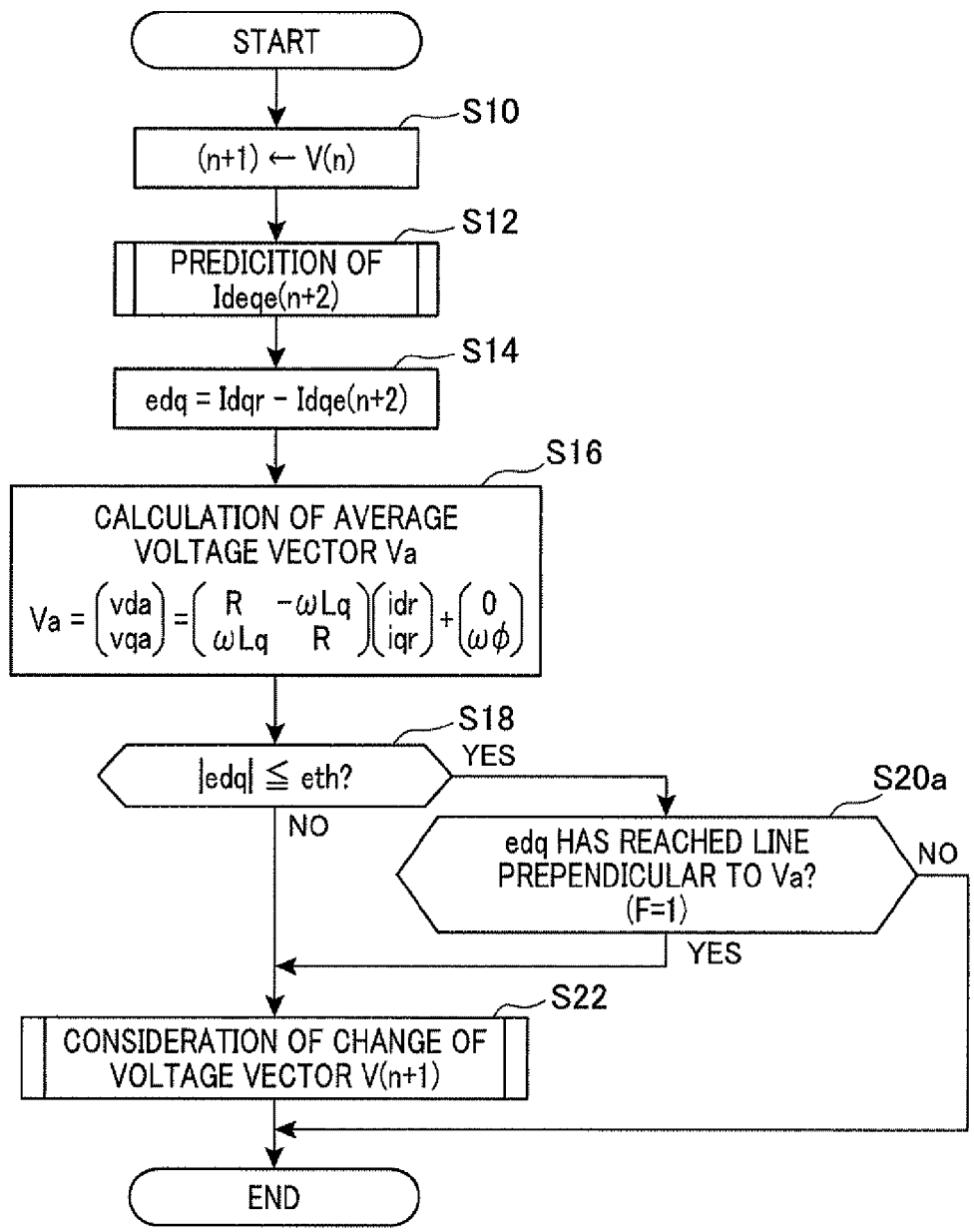
FIG. 13 is a flowchart showing the operation of model predictive control performed by a control apparatus according to a second embodiment of the invention.

FIG. 13 is a flowchart showing the operation of the model predictive control performed in the second embodiment. This operation is performed repeatedly at regular time intervals by the control apparatus 20. In FIG. 8, the step numbers identical to those shown in FIG. 6 represent the same steps.

Figure 14:
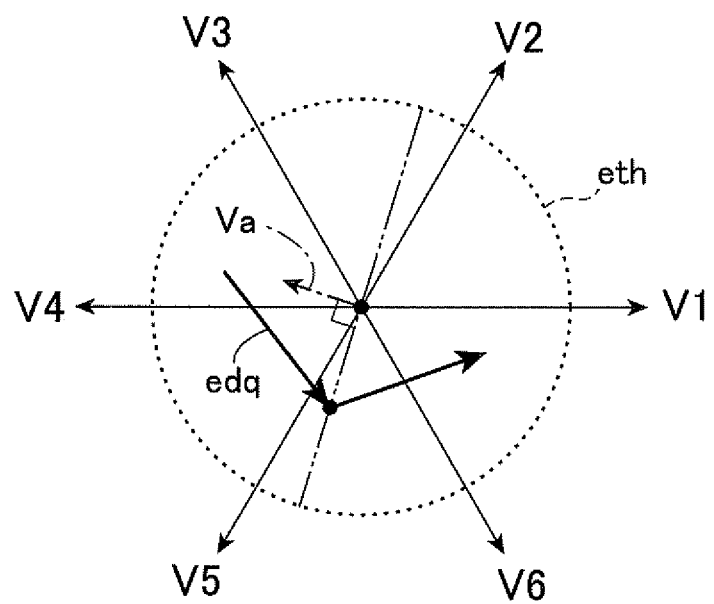
FIG. 14 is a diagram showing a process to consider change of a voltage vector in the model predictive control shown in FIG. 13.

This operation is different from the equivalent operation of the first embodiment in the condition to set the state transition permission flag F to 1. The condition in the first embodiment is that the magnitude relationship between the norm |Idqr| of the command current vector Idqr and the norm |Idqe| of the predicted current vector Idqe reverses. However, in the second embodiment, it is that the end point of the error vector edq whose start point is at the origin point reaches a straight line (the phantom line shown in FIG. 14) which is orthogonal to the average voltage vector Va and passes the origin point.

The advantages provided by the first embodiment can be provided also by the second embodiment.

Third Embodiment

Next, a third embodiment of the invention is described with particular emphasis on the difference with the first embodiment.

Figure 15:
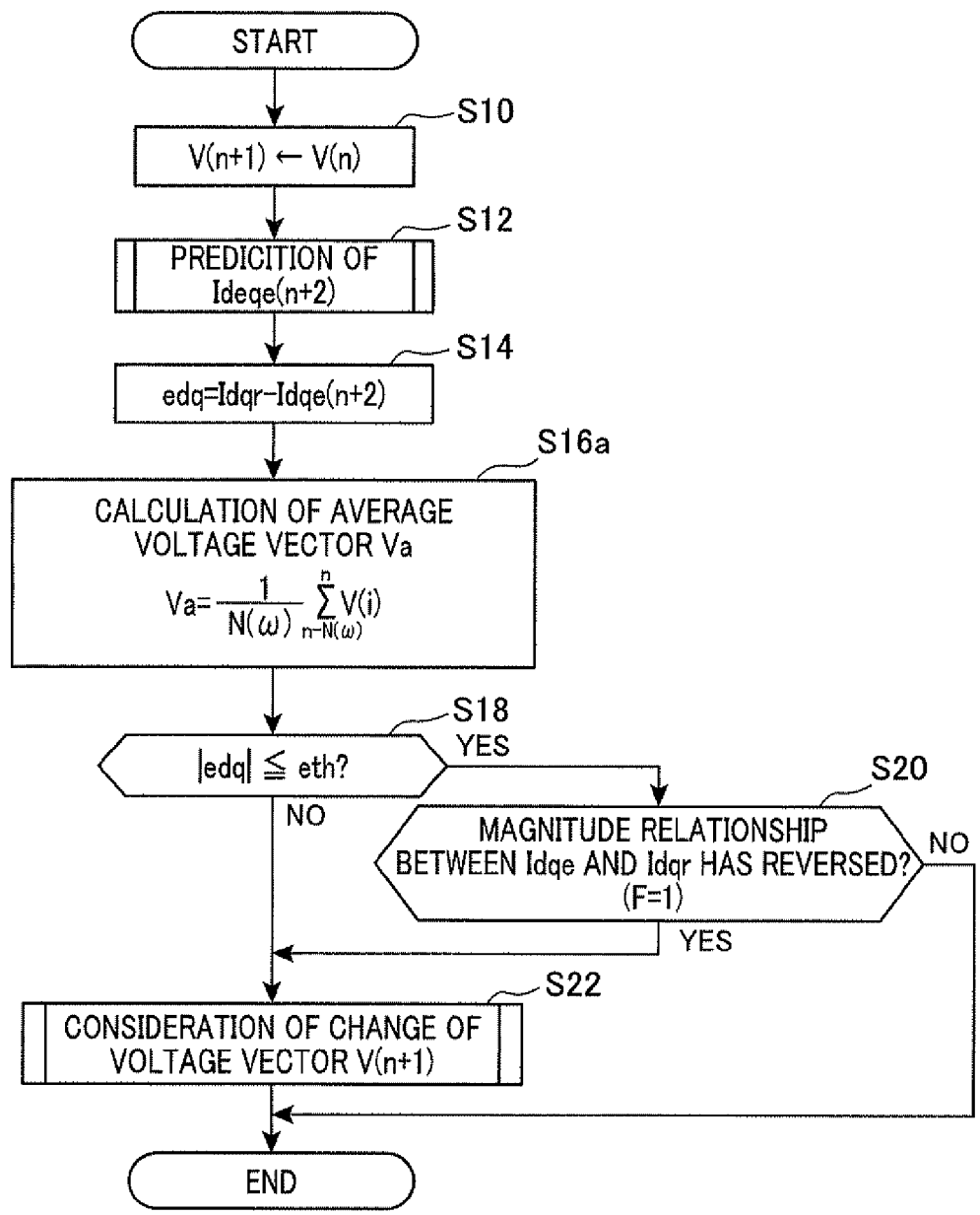
FIG. 15 is a flowchart showing the operation of model predictive control performed by a control apparatus according to a third embodiment of the invention.

FIG. 15 is a flowchart showing the operation of the model predictive control performed in the third embodiment. This operation is performed repeatedly at regular time intervals by the control apparatus 20. In FIG. 15, the step numbers identical to those shown in FIG. 6 represent the same steps.

This operation is different from the equivalent operation of the first embodiment in the way to calculate the average voltage vector Va. In the second embodiment, the average voltage vector Va is calculated in step S16a by calculating a simple moving average of the voltage vectors V(n), V(n−1), ... V(n−N) representing the operation states which have been adopted respectively at the past N(>2) update timings until the previous update timing. Since period of the control cycle Tc is constant, the number N is variably set in accordance the electrical angular velocity ω. This is because since the average voltage vector Va is a vector corresponding to the fundamental frequency, to calculate the average voltage vector Va based on a simple moving average of a plurality of the time-series voltage vectors, it is preferable to variably set the period to calculate the moving average depending on the fundamental frequency.

The advantages provided by the first embodiment can be provided also by the third embodiment.

Fourth Embodiment

Next, a fourth embodiment of the invention is described with particular emphasis on the difference with the first embodiment.

Figure 16:
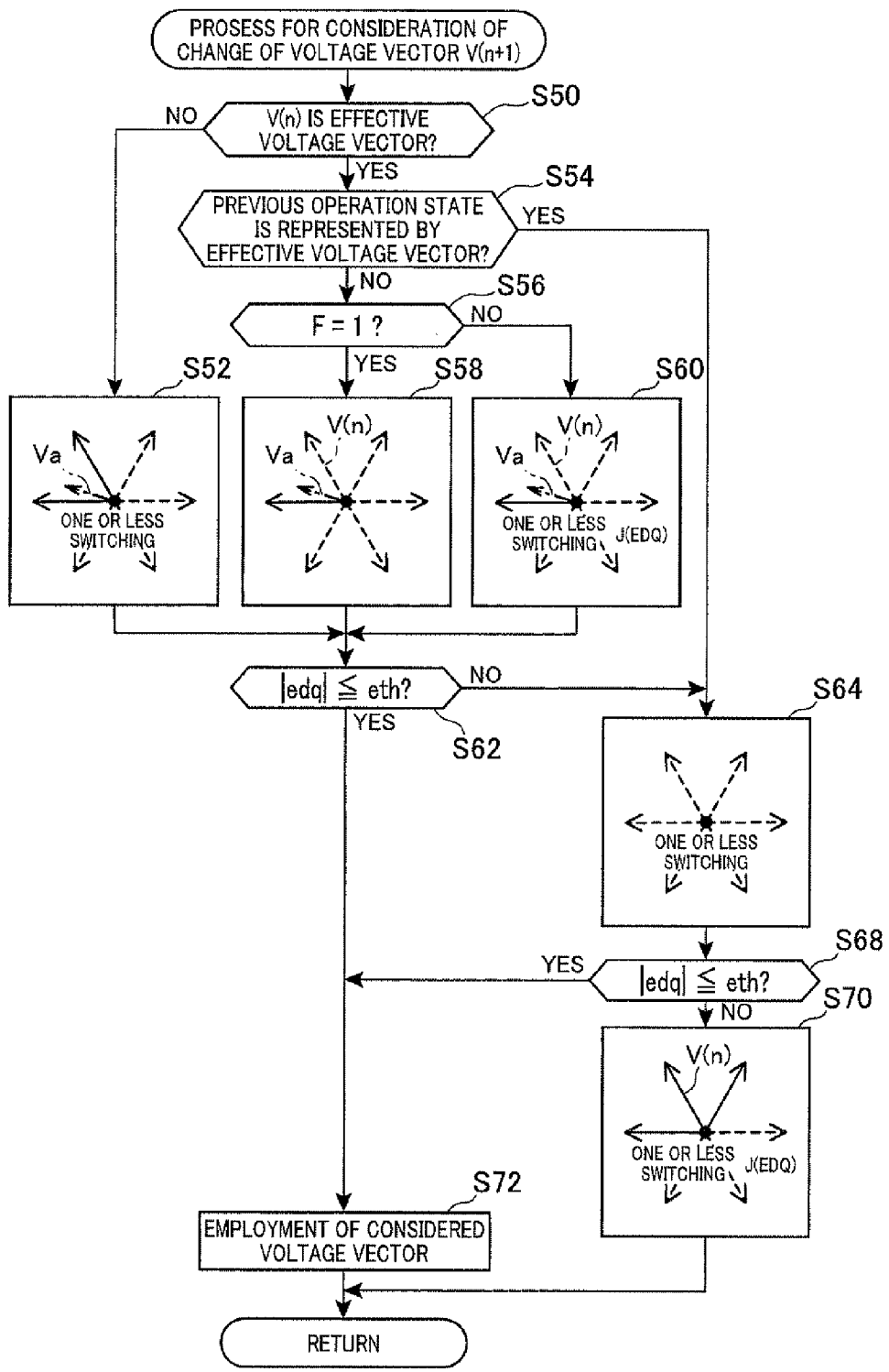
FIG. 16 is a flowchart showing a process to consider change of a voltage vector in model predictive control performed by a control apparatus according to a fourth embodiment of the invention.

FIG. 16 is a flowchart showing a process to consider change of the voltage vector performed in this embodiment. This process is performed repeatedly at regular time intervals by the control apparatus 20. In FIG. 16, the step numbers identical to those shown in FIG. 9 represent the same steps.

This process begins at step S50 to determine whether or not the voltage vector V(n) representing the present operation state is the effective voltage vector. If the determination result in step S50 is negative, the process proceeds to step S52 where the process determines that the operation state represented by one the two effective voltage vectors making the smallest angles with the average voltage vector Va, which can be achieved through switching of one or less phase, has the highest priority, and sets it as an object of prediction.

On the other hand, if the determination result in step S50 is affirmative, the process proceeds to step S54 to determine whether or not the voltage vector representing the previous operation state is the effective voltage vector. If the determination result in step S54 is negative, the process proceeds to step S56 to determine whether or not the state transition permission flag F is 1. If the determination result in step S56 is affirmative, the process proceeds to step S58 where the process determines that the operation state represented by one the two effective voltage vectors forming the smallest angles with the average voltage vector Va, which does not represent the present operation state, has the highest priority, and sets it as an object of prediction.

On the other hand, if the determination result in step S56 is negative, the process proceeds to step S60 where the process determines that the operation state represented by one the two effective voltage vectors, which is not the voltage vector (Vn) representing the present operation state, and the operation state represented by the voltage vector and achievable through switching of one or less phase have the highest priorities, and sets one of them, which is given a higher evaluation by the evaluation function J as an object of consideration.

After completion of steps S52, S58 and S60, the process proceeds to step S62 to determine whether or not the norm |edq| of the error vector edq for the operation state set as an object of consideration is smaller than or equal to the threshold value eth. If the determination result in step S62 is affirmative, the process proceeds to step S72 to adopt the operation state determined to have the highest priority and set as an object of consideration for the change.

On the other hand, if the determination result in step S54 is affirmative, or the determination result in step S62 is negative, the process proceeds to step S64 where the process determines that of the operation states represented by the zero voltage vectors, the one achievable through switching of one or less phase has the highest priority. In subsequent step S68, the process determines whether or not the norm |edq| of the error vector edq for this operation state is smaller than or equal to the threshold value eth.

If the determination result in step S68 is affirmative, the process proceeds to step S72.

On the other hand, if the determination result in step S68 is negative, the process proceeds to step S70 to adopt one of the operation states each achievable from the present operation state represented by the present voltage vector V(n) through switching of one or less phase, which is given the highest evaluation by the evaluation function J.

After completion of steps S70 or S72, the process is terminated.

Incidentally, it is apparent that, if a negative determination is made in step S62 for the operation state set as an object of consideration in step S60, a negative determination will be made in step S68 for the operation state set as an object of consideration in step S64. Accordingly, when a negative determination is made in step S62 for the operation state set as an object of consideration in step S60, the process may skip to step S70.

According to the fourth embodiment described above, other than the above advantages (1) to (3), and (5) to (15) provided by the first embodiment, the following advantage can be obtained.

(16) If the voltage vector representing the operation state set as an object of prediction when the norm |edq| of the error vector edq is determined to be larger than the threshold value eth is the effective voltage vector, and the voltage vector representing the previous operation state is the zero voltage vector, the operation state which is represented by one of the two voltage vectors making the smallest angles with the average voltage vector Va, which does not represent the present operation state is determined to have the highest priority (step S60) in addition to the zero voltage vector. This makes it possible to prolong the period in which the norm |edq| of the error vector edq is smaller than or equal to the threshold value eth as much as possible.

Other Embodiments

The above embodiments may be modified as described below. Regarding the zero voltage prioritizing means: The condition to make the determination that the operation state represented by the zero voltage vector has a higher priority than any one of the operation states represented by the effective voltage vectors is not limited to that described in the above embodiments. For example, the condition may be that the vector representing the actual operation state when the norm of the error vector edq becomes larger than the threshold value eth is the effective voltage vector. Further, the condition may be that a logical sum of the above exemplified condition and the following condition (a) is true.

The condition (a): The vector representing the actual operation state when the norm of the error vector becomes larger than the threshold value eth is the effective voltage vector, and there is the voltage vector that makes an angle smaller than or equal to the predetermined angle A with the average voltage vector Va.

The configuration of the zero voltage vector prioritizing means is not limited to the one described in the above embodiments. For example, the evaluation function J may be configured to give higher priority to the operation states represented by the zero voltage vector. This can be implemented by weighting the evaluation function J such that a smallest weight is used when the evaluation function J evaluates the operation state represented by the zero voltage vector.

Regarding the Present State Prioritizing Means:

The present state prioritizing means is not limited to the one configured to maintain the present operation state when the norm of the error vector edq is smaller than the threshold value eth and the state transition permission flag F is off. For example, it may be implemented by configuring the evaluation function J to give higher priority to the present operation state when a predetermined condition is satisfied. This can, be implemented by weighting the evaluation function J such that a smallest weight is used when the evaluation function J evaluates the present operation state.

Further, the present state prioritizing means may be eliminated.

Regarding the Effective Voltage Vector Prioritizing Means:

The effective voltage vector prioritizing means is not limited to the one described in the above embodiments. For example, it may be implemented by configuring the evaluation function J to give higher priority to the operation state represented by the effective voltage vector making the smallest angle with the average voltage vector Va on condition that the norm of the error vector edq is larger than the threshold value eth and the voltage vector representing the present operation state is the zero voltage vector. This can be implemented by weighting the evaluation function J such that a smallest weight is used when the evaluation function J evaluates the operation state represented by the effective voltage vector under the above condition.

Regarding the State Transition Permitting Means:

The condition to turn on the state transition permission flag F is not limited to the one described in the above embodiments. For example, the condition may be that the end point of the error vector edq deviates outside the area surrounded by the two effective voltage vectors whose start points are at the point at which the error vector edq is 0, and making the smallest angles with the average voltage vector Va. For another example, the condition may be that the error vector deviates outside this area after the endpoint thereof deviates from this area.

Regarding the State Transition Prioritizing Means:

The state transition prioritizing means is not limited to the one described in the above embodiments. For example, it may be implemented by configuring the evaluation function J to give higher evaluation to the operation state which is represented by the effective voltage vector making the smallest angle with the average voltage vector Va and is not the present operation state, on condition that the state transition permission flag F is turned on. This can be implemented by weighting the evaluation function J such that a smallest weight is used when the evaluation function J evaluates the operation state which is represented by the effective voltage vector under the above condition and is not the present operation state.

The above embodiments may be modified to maintain the present operation state when it is determined that the error vector will exceed the allowable range if the operation state which is represented by the effective voltage vector making the smallest angle with the average voltage vector Va and is not the present operation state is set as an object of prediction when the state transition permission flag F is turned on.

Regarding the Priority Setting Means:

The priority setting means is not limited to the one in which the condition to give higher priority to the operation state represented by the zero voltage vector than any one of the operation states represented by the effective voltage vectors is that the norm of the error vector edq becomes larger than the threshold value eth.

For example, the condition may be that the end point of the error vector edq reaches the straight line which passes the start point of the error vector and extends in the direction of the average voltage vector Va. Such a condition is advantageous when the inverter IV operates in the over-modulation range where the modulation index is larger than 1. This is because such a condition facilitates the end point of the error vector edq to deviate toward the origin point from the point P2 shown in FIG. 5, so that the end point distances away from the straight line extending in the direction of the average voltage vector Va when the norm of the error vector edq becomes larger than the threshold value eth.

For another example, the condition may be that the end point of the error vector edq enters the area surrounded by the two effective voltage vectors opposite in direction to the two effective voltage vectors which are the nearest to the average voltage vector Va.

Regarding the Inhibiting Means:

The logic of the inhibiting means to inhibit the number of the terminals of the electric rotating machine (motor/generator 10) respectively connected to the switching elements to be switched for the switch state change from becoming larger than 1 is not limited to the one as shown in FIG. 8 or 16. For example, it may have a logic that sets, as objects of prediction, all the operation states in each of which the number of the terminals of the electric rotating machine respectively connected to the switching elements to be switched for the switching state change is less than or equal to 1 at every control cycle, and inhibits a change to any operation state other than the operation states set as the objects of prediction. Also in this case, it is possible to perform a similar process as that shown in FIG. 8 or FIG. 16 by the provision of the zero voltage prioritizing means and the effective voltage prioritizing means.

The inhibiting means to inhibit the number of the terminals of the electric rotating machine connected to the switching elements to be switched for the switch state change from becoming larger than 1 may not be provided. In this case, an inhibiting means to inhibit the number of the terminals of the electric rotating machine connected to the switching elements to be switched for the switch state change from becoming larger than 2 may be provided instead.

Regarding the Average Voltage Direction Calculating Means:

1. The average voltage direction calculating means inputted with the current-related parameter is not limited to the one configured to input the command current to the voltage equation eliminated with the derivative term of the current. For example, a detection value of the current flowing through the motor/generator 10 may be inputted to the voltage equation. However, it is preferable that the detection value is filtered before being inputted to the voltage equation.

Further, the average voltage direction calculating means is not limited to the one configured to αβ-converts the average voltage vector in the dq-axes calculated from the voltage equation for the dq-axes eliminated with the derivative term of the current. For example, an αβ-converted version of the voltage equation for calculating the average voltage vector in the dq-axes may be used. In this case, the input and output of the average voltage direction calculating means are the currents in the αβ-axes and the average voltage vector on the αβ-coordinate system, respectively. Preferably, the input currents are αβ-converted versions of the command currents idr and iqr, although the ββ components of the actual current can be used.

The average voltage direction calculating means may be provided with means configured to receive the currents of the three phases, and output the average voltage vector on the fixed three dimensional coordinate system. In this case, preferably, the input currents are three phase-converted versions of the command currents idr and iqr, although the three phase components of the actual current can be used.

Further, the average voltage direction calculating means is not limited to the voltage equation eliminated with the derivative term of the current. For example, it may be the following equation (c5) including the derivative term of the command value Iαβr=(iαr, iβr) in the αβ-axes.

$$\begin{pmatrix} v\alpha \\ v\beta \end{pmatrix} = p\vec{L}\begin{pmatrix} i\alpha r \\ i\beta r \end{pmatrix} + \vec{R}\begin{pmatrix} i\alpha r \\ i\beta r \end{pmatrix} + \omega\phi\begin{pmatrix} -\sin\theta \\ \cos\theta \end{pmatrix} - \vec{R} \cdot edq \quad (c5)$$

$$\vec{L} = \begin{pmatrix} L1\cos2\theta + L0 & L1\sin2\theta \\ L1\sin2\theta & -L1\cos2\theta + L0 \end{pmatrix}$$

$$\vec{R} = \begin{pmatrix} R & 0 \\ 0 & R \end{pmatrix}$$

$$L0 = (Ld + Lq)/2$$

$$L1 = (Ld - Lq)/2$$

Incidentally, the above equation (c5) is derived from the following equation (c6) representing the relationship between the current vector Iαβ and the present voltage vector Vi, by eliminating the current vector Lαβ and assuming the voltage vector to be the zero voltage vector in the equation (c6).

$$Vi = p\overline{L}I\alpha\beta + \overline{R}I\alpha\beta + \omega\phi \tag{c6}$$

The average voltage direction calculating means inputted with the current-related parameter may be such as to calculate a change in direction of the error vector edq formed by subtracting the detected current vector Idq from the command current vector Idqr during a period in which the operation state of the inverter IV is the one represented by the zero voltage vector.

2. The average voltage direction calculating means inputted with the current-related parameter is not limited to the one that performs the simple moving average process on the voltage vectors representing the actual operation states of the inverter IV. For example, the average voltage direction calculating means may be configured to perform an index moving average process in which smaller weight coefficients are used for older inputs. However, such an averaging process is not absolutely necessary to detect the direction of the average voltage vector.

3. The average voltage vector Va does not necessarily have to be associated with the fundamental-wave component of the output voltage of the inverter IV. For example, the average voltage vector may be defined based on an average value of the output voltage of the inverter IV for a period shorter than one electrical angle cycle necessary to implement a command value for a variable such as the current of the motor/generator and longer than the control cycle Tc. More specifically, it may be defined based on an average value of a voltage used to implement the command value of the current (the command currents idr and iqr) predicated on the fundamental-wave component which is superimposed with the sixth harmonic current component in the over modulation range. Incidentally, the technique of superimposing a sixth harmonic component onto a command value is described, for example, in "Fast Torque Control System of PMSM based on Model Predictive Control in Consideration of Inverter Overmodulation Range, by HOZUMI, ISHIDA, MICHIKI and OOKUMA, 2009, Annual Conference of I.E.E. of Japan. Industry Applications Society" Regarding the controlled variable:

The controlled variable used for determining the operation state of the inverter IV in accordance with the command value and predicted value is not limited to the current. For example, it may be torque or magnetic flux. In this case, a flux command value is set to enable maximum torque control. Also in this case, it is effective to consider change of the operation state of the inverter IV based on the average voltage vector Va when the torque or flux deviates from a predetermined range.

Further, the operation state may be determined in accordance with the current and torque.

In this case, although the torque is determined uniquely when the d-axis current and q-axis current are determined, both the current and torque may be set as objects of prediction. This makes it possible that the predicted current is used only for the process to set the value of the state transition permission flag F, and for the other processes, comparison between a difference between variation between the predicted torque and the command torque and a predetermined threshold value is made, instead of making comparison between the norm of the error vector edq and the threshold value eth.

In the above embodiments, the final controlled variable of the electric rotating machine (the controlled variable ultimately required to be at the desired value whether it is an object of prediction or not) is the torque. However, it may be the rotational speed.

Regarding the Prediction Means:

In the above embodiments, timing to detect the current is synchronized with timing to update the operation state of the inverter IV. However, the current may be detected at the center timing between each time-adjacent update timings. Also in this case, it is effective to predict, based on the detected current, the current at the next update timing as an initial value of the current prediction of the operation state of the inverter set at the next update timing.

In the above embodiments, timing to detect the electrical angle θ is synchronized with the update timing of the operation state of the inverter IV. However, the electrical angle θ may be detected at the center timing between each time-adjacent update timings.

In the above embodiment, the controlled variable at a time one control cycle ahead from the update timing of the operation state of the inverter IV is predicted. However, the controlled variable at a time within one control cycle ahead from the update timing of the operation state of the inverter IV may be predicted.

The technique for discretizing the continuous system model is not limited to the one that uses a difference method such as a forward difference method. For example, the continuous system model may be discretized using a linear multi-step method, or Runge-Kutta method.

The model used to predict the current is not limited to the one that neglects iron loss. The current may be predicted using a model that takes into account iron loss.

The model used to predict the current is not limited to the one that is predicated on the fundamental component. For example, the current may be predicted using a model predicated on the harmonic components of the induced voltage or inductance. Further, the current may be predicted using a map instead of the model. In this case, input parameters of the map may be the voltage (vd, vq), or electrical angular velocity ω, or may include the temperature. Here, the map is a storage means in which values of its output parameters corresponding to discrete values of the input parameters are stored.

In the above embodiments, the controlled variable of the motor/generator at the next update timing (the timing one control cycle ahead) of the operation of the inverter IV is predicted. However, it is possible to determine the operation state of the inverter IV at the update timing one control cycle ahead, by predicting the controlled variable of the inverter IV at each of the update timings up to several control cycles ahead. Such a determination may be made in step S44 shown in FIG. 9, or steps S60 and S70 shown in FIG. 16. Incidentally, as an output of the evaluation function in this case, the sum of outputs of the evaluation function J inputted with the error vector edq at each of the update timings can be used. In this case, evaluation results by the evaluation function J at each of the update timings may be given the same contribution factor. Alternatively, an evaluation result for a more distant future may be given a smaller contribution factor.

The above embodiments are directed to an interior permanent magnet synchronous machine. However, the present invention is applicable also to a surface permanent magnet synchronous machine, and a field winding synchronous machine. Further, the present invention is also applicable to an induction rotating machine such as an induction motor.

Although the above embodiments are directed to a hybrid vehicle, the present invention is also applicable to an electric rotating machine mounded on an electric vehicle, whether the electric rotating machine is used as a main engine or not.

Although the high voltage battery 12 is used as a DC power source in the above embodiments, the DC power source may be output terminals of a converter which steps up the voltage of the high voltage battery 12.

The above explained preferred embodiments are exemplary of the invention of the present application which is described solely by the claims appended below. It should be understood that modifications of the preferred embodiments may be made as would occur to one of skill in the art.

What is claimed is:

1. A control apparatus for an electric rotating machine comprising:
   a prediction section to predict a controlled variable of the electric rotating machine applied with an output voltage of a power conversion circuit for each of prescribed operation states of the power conversion circuit including switching elements each connected to a corresponding one of terminals of the electric rotating machine and on/off-controlled to make and break electrical connection between a positive or a negative terminal of a DC power source and the corresponding one of the terminals of the electric rotating machine; and
   a manipulation section to manipulate the power conversion circuit to operate in one of the operation states as an actual operation state determined based on the controlled variable predicted by the prediction section, wherein
   the control apparatus further comprises an average voltage direction calculating section to calculate a direction of an average output voltage vector of the power conversion circuit, and
   the manipulation section includes a priority setting section to set priority for each of the operation states based on the direction of the average output voltage vector calculated by the average voltage direction calculating section in determining the actual operation state.

2. The control apparatus according to claim 1, wherein each of the operation states is represented by a corresponding one of voltage vectors including effective voltage vectors and zero voltage vectors, and the priority setting section gives higher priority to the operation state represented by one of a pair of the two effective voltage vectors making the smallest angles with the average output voltage vector than to the operation states represented by the effective voltage vectors other than the pair of the two effective voltage vectors.

3. The control apparatus according to claim 1, wherein the priority setting section selects the operation states given higher priority as objects of prediction by the prediction section, and the manipulation section determines one of the operation states selected as the objects of prediction as the actual operation state.

4. The control apparatus according to claim 1, further comprising an allowable range determination section to make a determination whether or not a predicted difference between a predicted value of the controlled variable when the power conversion circuit is assumed to operate in a present operation state and a command value of the controlled variable received from outside is within a predetermined allowable range,
   the priority setting section including a present state prioritizing section to give a highest priority to a present operation state of the power conversion circuit on condition that the predicted difference is determined to be within the allowable range.

5. The control apparatus according to claim 4, wherein the present state prioritizing section determines the present operation state as the actual operation state when the priority setting section gives the highest priority to the present operation state.

6. The control apparatus according to claim 4, wherein the priority setting section includes a zero voltage vector prioritizing section configured to give the highest priority to the operation state represented by the zero voltage vector on condition that a first condition is satisfied, the first condition being that the voltage vector representing the operation state set as an object of prediction when the predicted difference is determined to be outside the allowable range is the effective voltage vector.

7. The control apparatus according to claim 6, wherein the zero voltage vector prioritizing section sets the operation state represented by the zero voltage vector as an object of prediction when the priority setting section gives the highest priority to the operation state represented by the zero voltage vector, and determines the operation state represented by the zero voltage vector and set as the object of prediction as the actual operation state if the predicted difference is determined to be within the allowable range.

8. The control apparatus according to claim 6, wherein the priority setting section gives the highest priority to the operation state represented by the zero voltage vector, if a logical product of the first condition and a second condition is true, the second condition being that the voltage vector representing the previous operation state immediately before the present operation state is the effective voltage vector.

9. The control apparatus according to claim 8, wherein the priority setting section gives the highest priority to the operation state represented by the zero voltage vector, if a logical sum of third and fourth conditions is true, the third condition being that a logical product of the first and second conditions is true, the fourth condition being that a logical product of the first condition and a fifth condition is true, the fifth condition being that there is the effective voltage vector that makes an angle smaller than or equal to 20 degrees with the direction of the average output voltage vector calculated by the average voltage direction calculating section.

10. The control apparatus according to claim 6, wherein, if the voltage vector representing the operation state set as the object of prediction when the predicted difference is determined to be outside the allowable range is the effective voltage vector, and the voltage vector representing the previous operation state immediately before the present operation state is the zero voltage vector,
    the zero voltage vector prioritizing section gives the highest priority to the operation state represented by the zero voltage vector and to the operation state represented by one of the two voltage vectors making the smallest angles with the direction of the average output voltage vector calculated by the average voltage calculating section, which does not represent the present operation state.

11. The control apparatus according to claim 10, wherein, when the zero voltage vector prioritizing section gives the highest priority to the operation state represented by the zero voltage vector and the operation state represented by the one of the two voltage vectors,
    the priority setting section sets the operation state represented by the zero voltage vector and the operation state represented by the one of the two voltage vectors as the objects of prediction, and sets, as the actual operation state, one of the operation states set as the objects of prediction, which has the minimum predicted difference, on condition that at least one of the predicted differences calculated for the respective operation states set as the objects of prediction is within the allowable range.

12. The control apparatus according to claim 4, wherein the priority setting section includes an effective voltage vector prioritizing section configured to give the highest priority to the operation state represented by one of a pair of the two effective voltage vectors making the smallest angles with the average output voltage vector, if the voltage vector representing the operation state set as an object of prediction when the predicted difference is determined to be outside the allowable range is the zero voltage vector.

13. The control apparatus according to claim 12, wherein, when the effective voltage vector prioritizing section gives the highest priority to the operation state represented by the one of the pair of the two effective voltage vectors making the smallest angles with the average output voltage vector, the priority setting section sets the operation state represented by the one of the pair of the two effective voltage vectors as an object of prediction, and the manipulation section determines the operation state set as the object of prediction as the actual operation state, if the predictive difference is determined to be within the allowable range.

14. The control apparatus according to claim 4, wherein the controlled variable includes a current flowing through the electric rotating machine, and the control apparatus further comprises a state transition determination section configured to determine whether or not a predetermined condition is satisfied, the predetermined condition being that, when a subtracted vector value is defined as a vector value obtained by subtracting a vector value corresponding to a command value of the current flowing through the electric rotating machine from a vector value corresponding to a predicted value of the current predicted by the prediction section, the subtracted vector value deviates from an area surrounded by a pair of the two effective voltage vectors adjacent to the average output voltage vector when start points of the average output voltage vector and the effective voltage vectors are set to a point at which the subtracted vector value is 0, the priority setting section including a state transition prioritizing section configured to give the highest priority to one of the pair of the two effective voltages, which does not represent the present operation state when the predetermined condition is satisfied.

15. The control apparatus according to claim 14, wherein, when the state transition prioritizing section gives the highest priority to the operation state represented by the one the pair of the two effective voltage vectors, the manipulation section sets the operation state represented by the one of the pair of the two effective voltage vector and given the highest priority as an object of prediction, and determines the operation state set as the object of prediction as the actual operation state, if the predicted difference is determined to be within the allowable range.

16. The control apparatus according to claim 4, wherein the manipulation section includes an optimum searching section configured to set, as a next operation state of the power conversion circuit, the operation state in which the predicted difference is minimum of all the operation states achievable through switching of one or less of the switching elements when the predicted difference for the operation state given the highest priority by the priority setting section is determined to be outside the allowable range.

17. The control apparatus according to claim 1, further comprising an inhibition section configured to inhibit the operation state requiring two or more of the switching elements to be switched from being determined as the actual operation state.

18. The control apparatus according to claim 17, wherein the prediction section precludes the operation state inhibited by the inhibition section from being set as an object of prediction.

19. The control apparatus according to claim 1, wherein the controlled variable includes a current flowing through the electric rotating machine, and the average voltage direction calculating section calculates the direction of the output voltage vector based on a command value of the current flowing through the electric rotating machine.

20. The control apparatus according to claim 1, wherein the prediction section includes a first prediction section to predict the controlled variable for the respective operation states to determine the actual operation state, and a second prediction section to predict an initial value of the controlled variable used for the first prediction section to predict the controlled value for the operation state determined as the actual operation state.

* * * * *